US007075919B1

(12) United States Patent
Wendt et al.

(10) Patent No.: US 7,075,919 B1
(45) Date of Patent: Jul. 11, 2006

(54) SYSTEM AND METHOD FOR PROVIDING INTEGRATED VOICE, VIDEO AND DATA TO CUSTOMER PREMISES OVER A SINGLE NETWORK

(75) Inventors: Thomas C. Wendt, Plano, TX (US); Patrick T. Robbins, Highland Village, TX (US); Allen D. Easty, Carrollton, TX (US); Michael J. Tobias, Highland Village, TX (US)

(73) Assignee: Cisco Technology, Inc., San Jose, CA (US)

(*) Notice: Subject to any disclaimer, the term of this patent is extended or adjusted under 35 U.S.C. 154(b) by 874 days.

(21) Appl. No.: 09/644,195

(22) Filed: Aug. 22, 2000

(51) Int. Cl.
*H04L 12/66* (2006.01)
(52) U.S. Cl. .................. 370/352; 370/487; 370/466
(58) Field of Classification Search ........... 370/352, 370/353, 354, 355, 389, 390, 537, 466, 265, 370/401, 485, 486, 487; 379/142.15, 142.16
See application file for complete search history.

(56) References Cited

U.S. PATENT DOCUMENTS

| | | | | |
|---|---|---|---|---|
| 5,550,900 A | * | 8/1996 | Ensor et al. | 379/88.11 |
| 5,625,865 A | | 4/1997 | Moehrmann | 455/4.2 |
| 5,748,736 A | * | 5/1998 | Mittra | 713/163 |
| 5,761,294 A | * | 6/1998 | Shaffer et al. | 379/230 |
| 5,767,895 A | | 6/1998 | Yashiro et al. | 348/12 |
| 5,805,154 A | * | 9/1998 | Brown | 345/717 |
| 5,828,666 A | * | 10/1998 | Focsaneanu et al. | 370/389 |
| 5,842,111 A | | 11/1998 | Byers | 455/6.3 |
| 6,028,917 A | * | 2/2000 | Creamer et al. | 379/100.01 |
| 6,215,483 B1 | * | 4/2001 | Zigmond | 725/112 |
| 6,314,094 B1 | * | 11/2001 | Boys | 370/352 |
| 6,510,152 B1 | * | 1/2003 | Gerszberg et al. | 370/352 |

FOREIGN PATENT DOCUMENTS

WO  WO 98/54901  12/1998

OTHER PUBLICATIONS

PCT, Notification of Transmittal of the International Search Report or the Declaration, 4 pages, Feb. 15, 2002.
Unknown, "Company," Minerva Networks, Powering IP Television, www.minervasys.com/company/about.htm, 1 page, Jan. 8, 2002.
Unknown, "IP Television," Minerva Networks, Powering IP Television, www.minervasys.com/iptv.htm, 2 pages, Jan. 8, 2002.
Unknown, "Backhaul," Minerva Networks, Powering IP Television, www.minervasys.com/backhaul.htm, 2 pages, Jan. 8, 2002.

(Continued)

Primary Examiner—Brian Nguyen
(74) Attorney, Agent, or Firm—Baker Botts L.L.P.

(57) ABSTRACT

A method for providing integrated voice, video, and data content in an integrated service offering to one or more customer premises includes receiving television programming from a programming source, receiving data from a data network, and receiving telephone communications from a telephone network. The method further includes placing the television programming, data, and telephone communications in a common format for integrated communication over a single network infrastructure using a common communication protocol. In addition, the method includes communicating the integrated television programming, data, and telephone communications in the common format over the single network infrastructure using the common communication protocol to one or more customer premises to provide the integrated service offering.

48 Claims, 24 Drawing Sheets

OTHER PUBLICATIONS

Unknown, "Conferencing," Minerva Networks, Powering IP Television, www.minervasys.com/conf.htm, 1 page, Jan. 8, 2002.

Unknown, "Education," Minerva Networks, Powering IP Television, www.minervasys.com/education.htm, 1 of 2 pages, Jan. 8, 2002.

Angela Langowski and Dana Mendell, "New kids on the block," CED Communications Engineering & Design, CED Jan. 2002, www.cedmagazine.com/ced/2001/0101/iw2.htm, 17 pages, Jun. 11, 2001.

Unknown, "Latest News and Events," Grande Communication, www.grandecom.com/index.jsp, 1 page, Dec. 17, 2001.

Unknown, "WINfirst," www.winfirst.com/default.html, 1 page, Dec. 18, 2001.

Joe Estrella, "Portland, Houston Gear Up for WIN, Grande," TVinsite, Multichannel News, Aug. 7, 2000,www.tvinsite.com/multichannelnews/index.asp.../2000&stt=001&display=searchResult, 3 pages, Dec. 18, 2001.

Joanna Glasner, "Coming Soon: Fiber to the Home," Wired News, www.wired.com/news/print/0,1294,39648,00.html, 4 pages, Dec. 18, 2001.

Unknown, Seren Innovations, cover page, www.seren.com, 1 page, Dec. 18, 2001.

John Borland, "Digital oases in a dial-up world," CNET News.Com, tech news first, Mar. 10, 1999, news.cnet.com/news/0,100000,0-1004-200-339804,00.html, 3 pages, Dec. 17, 2001.

Unknown, ClearWorks, subsidiary of Eagle Broadband, Bringing Fiber Optic Technology Home, complete brochure, www/clearworks.com, 5 pages (including cover), Dec. 17, 2001.

Alan Breznick, "Fiber-Optic Highway Drivers RCN's Success, Feisty telecommunications company advances miles on East and West coasts," Feb. 15, 1999, CableWorld, RCN applauds FCC decision on reciprocal compensation, www.rcn.com/investor/news/02.15.99.html, 2 pages, Dec. 18, 2001.

Angela Langowski, "Pie in the sky?, Interactive TV may offer all kinds of e-commerce revenues for all kinds of companies. Will operators get their cut?," CED Communications Engineering & Design magazine, www.cedmagazine.com/ced/0011/111.htm, 5 pages, Dec. 18, 2001.

Mitch Shapiro, "Fiber-deep broadband 'overbuilders' challenge incumbents," Broadband Markets, www.broadbandmarkets.com/articles/fibDeep2.htm, 6 pages, Dec. 18, 2001.

Ken Freed, "Over and Up: Cable Overbuilders Push Their Business Case," Broadband week.com, Oct. 2000 issue of Broadband Week, www.broadbandweek.com/news/0010/0010_cable_over.htm, 3 pages, Dec. 18, 2001.

"10 Gigabit Ethernet Technology Overview White Paper," 10 Gigabit Ethernet Alliance, 16 pages plus 1 page coversheet from Bitpipe, Nov. 6, 2001.

* cited by examiner

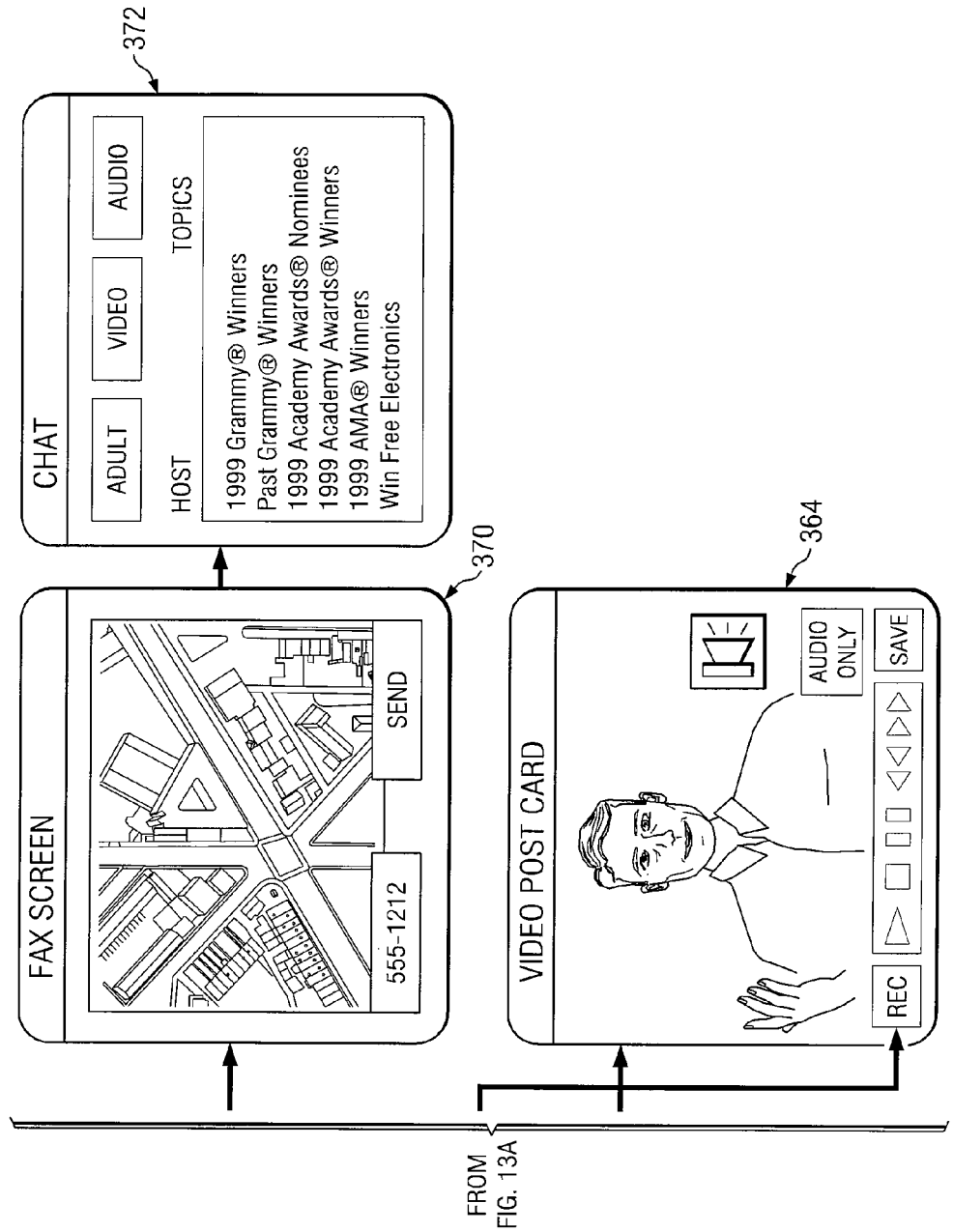

SYSTEM AND METHOD FOR PROVIDING INTEGRATED VOICE, VIDEO AND DATA TO CUSTOMER PREMISES OVER A SINGLE NETWORK

TECHNICAL FIELD OF THE INVENTION

This invention relates generally to the field of communications and networking, and more particularly to a system and method for providing integrated voice, video, and data to customer premises over a single network infrastructure.

BACKGROUND OF THE INVENTION

Voice, video, and data services are currently provided to customer premises over several different network infrastructures and by several different companies. For example, television programming is typically provided to customer premises through one of many private cable television networks or through satellite transmissions received using personal satellite dishes. Voice and other telephony are also communicated to customer premises over a separate infrastructure, the Public Switched Telephone Network (PSTN). The Internet also includes a separate infrastructure of various fiber optic and other data networks, often accessed from the customer premises through a private cable television network or the PSTN. Each of these network infrastructures has its own unique physical architecture, communication protocols, and other characteristics which are typically incompatible with the architectures, protocols, and characteristics of the other network infrastructures.

On occasion these infrastructures may share some components in order to reach the customer premises, but this typically requires layering systems on top of one another or requires translation between the various systems in order to provide the desired collection of services to the customer premises. For example, data may be communicated to the customer premises using a cable television network, in conjunction with a cable modem. However, to communicate this data along with cable television signals, repackaging and translation are required to fit the data into the cable television network's frequency space. Another example is the use of the PSTN to provide data to the customer premises using digital subscriber line (DSL) technology. The inherent incompatibility of traditional telephone and cable television networks with data networks such as the Internet has created many problems for both users and the service providers, preventing service providers from delivering integrated voice, video, and data to customer premises over a single network infrastructure.

SUMMARY OF THE INVENTION

According to the present invention, disadvantages and problems associated with previous systems and methods for providing voice, video, and data to customer premises have been substantially reduced or eliminated.

According to one embodiment of the present invention, a method for providing integrated voice, video, and data content in an integrated service offering to one or more customer premises includes receiving television programming from a programming source, receiving data from a data network, and receiving telephone communications from a telephone network. The method further includes placing the television programming, data, and telephone communications in a common format for integrated communication over a single network infrastructure using a common communication protocol. In addition, the method includes communicating the integrated television programming, data, and telephone communications in the common format over the single network infrastructure using the common communication protocol to one or more customer premises to provide the integrated service offering.

The system and method of the present invention provide a number of important technical advantages. Rather than attempting to converge the incompatible architectures, protocols, and other characteristics of the various existing voice, video and data network infrastructures, the present invention provides a single fully interoperable network that uses a common standard protocol, such as TCP/IP, to provide integrated voice, video, and data content to customer premises over a single communication link. Since all services are provided to the customer premises using a single network infrastructure, problems associated with delivering incompatible services to the customer premises are eliminated. The single network infrastructure of the present invention also allows for enhanced troubleshooting, fault-tolerance, access restriction, and other important benefits.

Not only does the delivery of voice, video, and data services over a single network infrastructure using a common protocol eliminate many technical problems, it also provides many opportunities to increase customer satisfaction. For example, since a number of services are delivered together by a single entity, customers can be charged for these services using a single bill. This bill may be provided to the user over the network. Furthermore, the use of a common protocol allows devices at the customer premises to be integrated and to provide functionality that is not available when these devices are coupled to and receive content from separate networks. For example, the customer's television may be used to answer video telephone calls and the customer's telephone may be used to change channels on the television. In addition, since various voice, video, and data services are provided using the same network infrastructure, these services may be combined in numerous ways. For example, caller identification information may be displayed over a movie that a customer is viewing on a television or a web link may be provided in association with a television commercial. A variety of other service combinations are similarly enabled. Other important technical advantages are readily apparent to those skilled in the art from the following figures, descriptions and claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
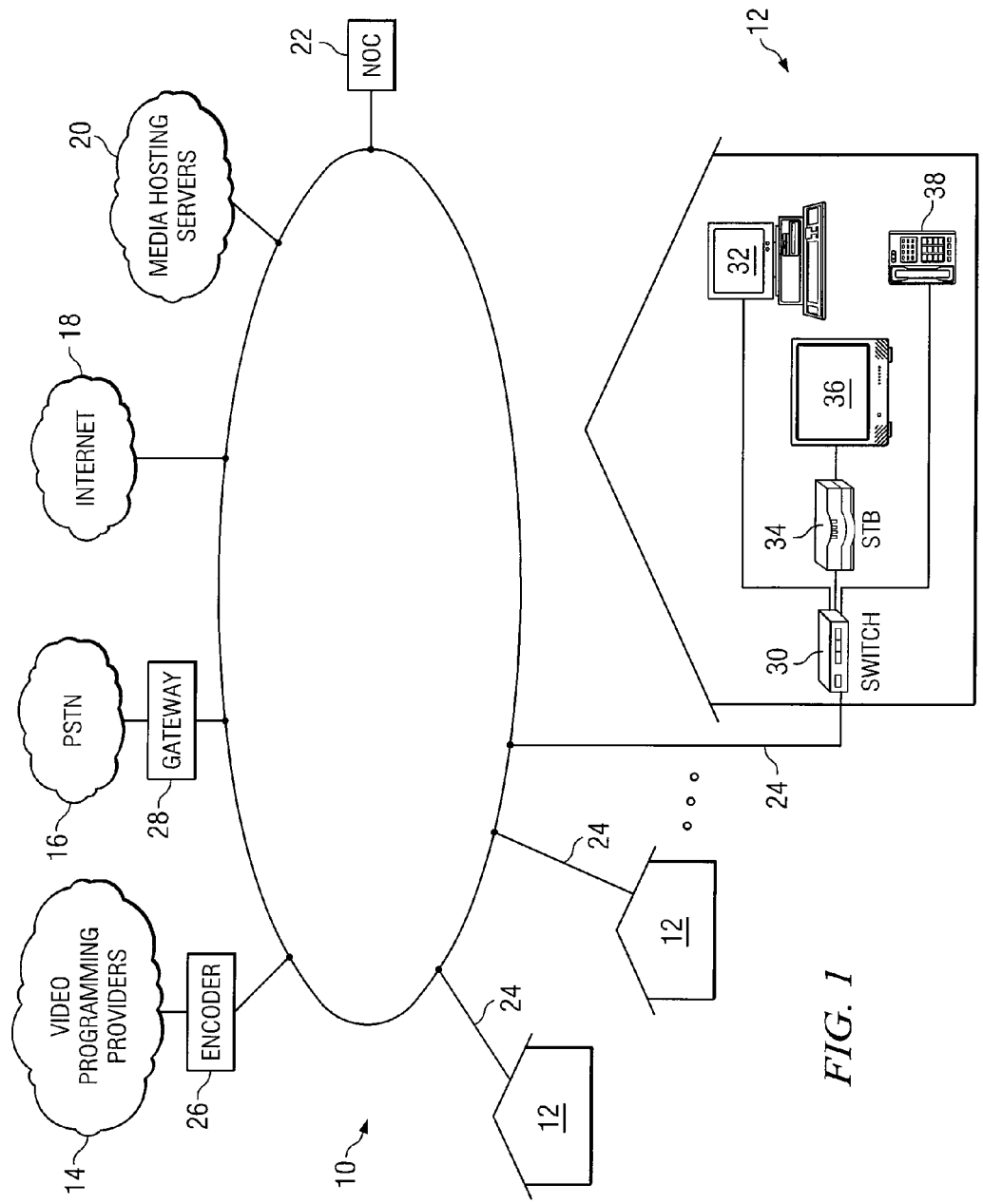
FIG. 1 illustrates an exemplary network for providing integrated delivery of voice, video, and data services to customer premises.

FIG. 1 illustrates an exemplary network 10 for providing integrated delivery of voice, video, and data services to customer premises 12. Network 10 may be coupled to one or more video programming providers 14, one or more telephone networks such as the Public Switched Telephone Network (PSTN) 16 or other appropriate telephone networks, one or more data networks such as the Internet 18, one or more media hosting servers 20, and any other appropriate sources of content and services that may be provided to customer premises 12 over network 10. Network 10 may be managed and controlled using equipment, software, and human administrators, in any appropriate combination, associated with one or more network operations centers (NOCs) 22.

Video programming providers 14, PSTN 16, Internet 18, media hosting servers 20, and other appropriate sources may provide their respective content and services using different technologies and protocols. For example, video programming providers 14 may include broadcast television stations that provide their content to users using radio frequency broadcasts and other television stations that typically provide their content to cable television companies and satellite broadcasting companies using satellite transmissions. The cable television and satellite broadcasting companies then provide the content to their subscribers using, respectively, a coaxial cable television (CATV) network and satellite transmissions received by users at personal satellite dishes.

User telephones are typically coupled to PSTN 16 using twisted-pair copper wiring that transmits analog telephone signals between customer premises 12 and a telephone central office. Telephone signals may be transmitted between central offices using many different types of protocols, such as the Asynchronous Transfer Mode (ATM) and Synchronous Optical Network (SONET) protocols. Data is communicated over Internet 18 using yet another communication protocol, the Transmission Control Protocol/Internet Protocol (TCP/IP). Users may be directly coupled to Internet 18 or they may access Internet 18 using other existing networks, such as a data connection over PSTN 16 or over a cable television network to an Internet Service Provider (ISP).

The disparate technologies used to provide these services to users results in a complex arrangement of wires and equipment at the user premises. The user also must deal with a number of service providers to obtain the services that the user desires. The present invention solves this problem by integrating these services on a single network 10 and providing the services to a customer premises 12 over a single communication link 24 using a common communication protocol. In a particular embodiment, this communication protocol is TCP/IP, however, any other appropriate communication protocol may be used, such as ATM or Packet Over SONET. Therefore, although TCP/IP and the equipment used to implement TCP/IP are described below, it should be understood that any other appropriate communication protocol and associated equipment may also be used.

Since many of the services provided using network 10 are not typically provided from their sources using TCP/IP, selected devices are used to translate the services from their original communication format to TCP/IP packets for communication over network 10 to customer premises 12. These devices may include, but are not limited to, an encoder 26 that digitizes (if required) and encapsulates video signals from video programming providers 14 into TCP/IP packets and a gateway 28 that digitizes (if required) and encapsulates telephone signals from PSTN 16 into TCP/IP packets. Since Internet 18 uses TCP/IP to communicate data, network 10 supporting TCP/IP may be directly coupled to Internet 18 to provide customer premises 12 with access to the World Wide Web, e-mail, and other Internet services. Similarly, media hosting servers 20 may provide content, such as video games, music files, and video on demand (VOD), that is stored digitally and communicated over network 10 in the form of TCP/IP packets. Media hosting servers 20 will typically include "TCP/IP stacks" that provide the necessary hardware and software for encapsulating data for transmission as TCP/IP packets.

After the selected services have been converted, if appropriate, into TCP/IP packets and communicated to network 10, the services may be delivered in any suitable combination to customer premises 12 according to the particular needs of associated users. Since the services are all communicated using a common protocol, the services may be combined in numerous ways not possible using conventional systems. For example, while a user is viewing a commercial that has been broadcast by a television network, an entity controlling network 10 may provide, in association with the commercial, an Internet "link" (for example, a link to a Hypertext Markup Language (HTML) document accessible using Internet 18) that a subscriber may select to purchase the product. Many other service combinations are possible, some of which are described in more detail below. The combination of services may be controlled from NOC 22 or any other appropriate facility in network 10 (such as a point-of-presence (POP), described below).

Since there are numerous customer premises 12 coupled to network 10, each customer premises 12 may be identified by one or more IP addresses to which services may be directed using network 10. In a particular embodiment, selected services are provided to multiple customer premises 12 using IP multicast, which is described in further detail below. For example, a particular television channel, such as CNN™, may be multicast to multiple customer premises 12 that request the channel and that have access to the channel. Any other appropriate method of communicating services over network 10, such as IP unicast or IP broadcast, may also be used. Packets sent to customer premises 12 may be received by one or more switches 30 that consolidate and distribute the incoming and outgoing packets to and from devices such as a computer 32, a set-top box 34 coupled to a television 36 (set-top box 34 receives and processes digital content for display on television 36), an IP telephone 38, and a variety of network appliances. Examples of network appliances may include home alarm systems, personal information devices, home appliances with network interfaces, home management systems, and Internet access devices. Alternatively, computer 32 and/or IP telephone 38 may be coupled to set-top box 34 and set-top box 34 may replace or be combined with switch 30.

As is described in further detail below, switch 30, computer 32, set-top box 34, IP telephone 38, and any other appropriate devices at customer premises 12 may be coupled to network 10 using a technology such as Ethernet. In this case, the IP packets may be encapsulated in Ethernet frames and each device may have an Ethernet network interface card (NIC) to which the incoming frames are addressed (each device may then have one or more IP addresses to which the associated IP packets are delivered). As is described below, a Layer 2 (referring to the Data Link layer of the OSI reference model) or other suitable switch may be used in network 10 to direct the Ethernet frames to the correct customer premises 12 and/or to the correct devices in a particular customer premises 12. For example, if customer premises 12 is an apartment in an apartment complex, the apartment complex may have an Ethernet switch that directs the incoming packets to the correct apartment. In a particular embodiment, network 10 is an end-to-end Ethernet network that uses multiplexed Gigabit Ethernet for network segments having large amounts of traffic and uses Fast Ethernet (for example, 100Base-T or 100Base-F) or regular Ethernet (for example, 10Base-T or 10Base-F) for segments having lower amounts of traffic. Individual Gigabit Ethernet network segments may have bandwidth capacities of one gigabit per second, two and a half gigabits per second, and ten gigabits per second per individual route segment, with the potential to go faster. Technologies such as dense wave division multiplexing (DWDM) have the ability to consolidate multiple Gigabit Ethernet network segments onto a single pair of optical fibers managed as part of a transport network.

Figure 2:
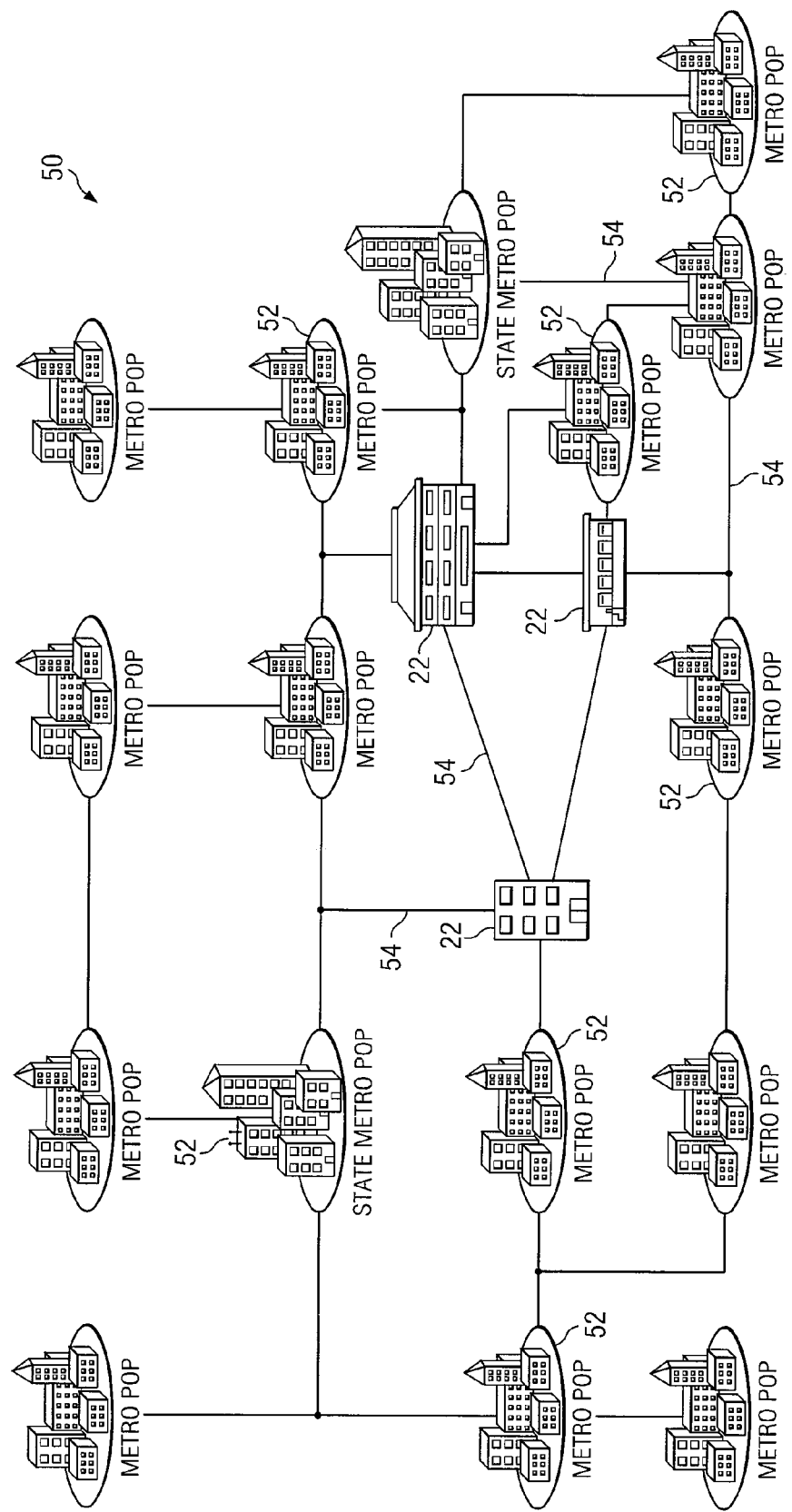
FIG. 2 illustrates an exemplary long-range distribution system within an exemplary network infrastructure.

FIG. 2 illustrates an exemplary long-range distribution system 50 of network 10. Distribution system 50 includes a national network of NOCs 22 and metropolitan POPs (metro POPs) 52 used to provide services to customer premises 12. Although a long-range network 10 is primarily described, the present invention applies equally to networks 10 of any size, from international networks to local area networks (LANs). The number of NOCs 22 and metro POPs 52 may be adjusted according to the size of network 10. NOCs 22 may be coupled to each other and with metro POPs 52 using fiber optic connections 54 that are part of network 10. In a particular embodiment DWDM is used to multiplex multiple Gigabit Ethernet channels between NOCs 22 and metro POPs 52. However, any appropriate method of coupling and providing communications between NOCs 22 and metro POPs 52 may be used.

Exemplary distribution system 50 of network 10 includes three NOCs 22. In one embodiment, three NOCs 22 are used so that network 10 will have a primary NOC 22 and a fail-over NOC 22 in operation even if another NOC 22 is taken off-line for maintenance or other reasons. The three NOCs 22 provide redundancy for each other and may be designed so that if one NOC 22 fails, the remaining two NOCs 22 can support the operation of network 10. However, network 10 may include a single or any other appropriate number of NOCs 22, one or more of which may operate at any one time. NOCs 22 are used to manage the operation of network 10 and to ensure the delivery of services to customer premises 12. This may include network monitoring, network management, network configuration, network security, and any other appropriate functions. NOCs 22 may also serve as billing centers and technical support centers.

NOCs 22 may also be used to generate content for use on network 10. For example, content generation performed at one or more NOCs 22 may include some or all pre-production, production, and post-production activities involved with the production of video services. This may include processes such as encoding video from original masters to a format suitable for communication over network 10, editing of video clips such as trailers, producing training videos and video messages provided over network 10, and other suitable video production activities. A NOC 22 may also serve as a metro POP 52 for its immediate service area and thus may include some or all of the components described below in conjunction with metro POPs 52. Therefore, in one embodiment, a NOC 22 can function as a disaster recovery site for any metro POP 52 in network 10.

Metro POPs 52 serve as the main distribution points of services to customer premises 12. Although a single metro POP 52 (or a NOC 22 providing metro POP services) might be used for an entire country, the use of multiple metro POPs 52 eliminates reliance on a single metro POP 52 and distributes the workload between multiple facilities. Furthermore, metro POP 52 may be located in the general vicinity of customer premises 12 (for example, in the same city) so that the distance that communications between a metro POP 52 and its respective customer premises 12 must travel is reduced. In addition, the distributed nature of metro POPs 52 illustrated in FIG. 2 also provides advantages in the provision of certain services, such as telephony services. For example only and not by way of limitation, each metro POP 52 may be associated with a city, although large cities may have more than one metro POP 52 and small cities may share a single metro POP 52. Telephone signals between customer premises 12 in these different cities could be communicated to the local metro POP 52 and then communicated to the other city using PSTN 16. Alternatively, because of the distributed nature of metro POPs 52, network 10 may be used to communicate the telephone signals between metro POPs 52. This bypasses PSTN 16 so as to eliminate reliance upon PSTN 16 and avoid long distance, toll, and tariff charges associated with the use of PSTN 16.

In one embodiment, metro POPs 52 may be coupled to NOCs 22, other metro POPs 52, and site POPs (described below) in a fault-tolerant "mesh" network architecture to provide numerous communication paths between these entities. Therefore, if a particular communication path fails, services may be provided using one or more alternate paths. This network architecture allows for automatic fail-over using configurable operating software at one or more NOCs 22, metro POPs 52, and site POPs (described below). When a network path fails, packet routes are re-calculated and the affected traffic is transmitted across one or more suitable remaining active network paths of network 10. This mode of automated healing ("self-healing") may occur at multiple layers within network 10, thus providing several paths for traffic to use in moving from source to destination.

The system of automated healing provides heuristic characteristics to network 10 that allow network 10 to not only identify and manage network failures but also to re-route packets based on congestion or over-subscription of available bandwidth. When this re-routing occurs, loss of service may be prevented due to the nature of the IP protocols employed for the voice, data, and video services being provided. The heuristic characteristics of network 10 provided by its self-healing capabilities also facilitate its ability to automatically provision and configure extensions to and changes within network 10.

Network 10 may include redundant and hot-swappable devices, and components within the network devices may also be redundant and hot swappable. When a component in a network device fails, automatic fail-over to a redundant or other suitable component may occur. In one embodiment, this may be accomplished at all network devices at "wire speed," thus producing no noticeable degradation in network service or performance. Furthermore, service intervention on a network device can be accomplished by replacing failed, hot swappable components without requiring the device to be powered down. Such redundancy and hot swappability provide additional healing capabilities for network 10.

Throughout the network operations and healing process, appropriate network management tools may be employed to automate the configuration, control, status, and repair of network 10 and its related devices and components. Network management tools may be deployed in a scalable fashion such that real-time, non-stop performance and fault statistics can be configured, monitored, and collected from each network device. Sample information of this type includes but is not limited to: threshold alarms, device configurations, static or dynamic routes and paths, application type, and geographic location. Any suitable combination of standards-based and proprietary protocols may be used to accomplish these tasks. Configuration, monitoring, and collection of network data may be accomplished for each of the NOCs 22 and POPs 52, as well as for customer premises equipment such as IP phones 38, set-top boxes 34, computers 32, and network appliances. Automated network monitoring and configuration also provides for application-level performance monitoring in addition to network protocol statistics. Monitoring and statistics management may allow for real-time display of key network attributes as well as provide a historical basis for business decision support.

In one embodiment, network management tools are deployed in a scalable fashion such that multiple network devices may be controlled individually or in batch mode to accomplish network system changes or to react to real time network healing issues. Sample operations of this type include but are not limited to: setting threshold alarms, configuring device operating systems, controlling routes and paths, setting quality of service parameters, and controlling application type and access rights using policy configuration. Any suitable combination of standards-based and proprietary protocols may be used to accomplish these tasks. Automated network control operations defined by parameters may be accomplished with little or no human intervention, thus allowing real-time or near real-time reaction to network healing issues.

Network management tools may also be used for network and application repairs. Sample operations of this type include but are not limited to: geographic indicator monitoring, physical device indicator monitoring, link repair status monitoring, standards-based automated trouble ticketing to external vendors, application provisioning, technical services, customer relations management, customer service management, and help desk support. Any suitable combination of standards-based and proprietary protocols may be used to accomplish these tasks. Repair status and control may be viewed across all network devices in context to other services and managed appropriately using automated processes.

Figure 3:
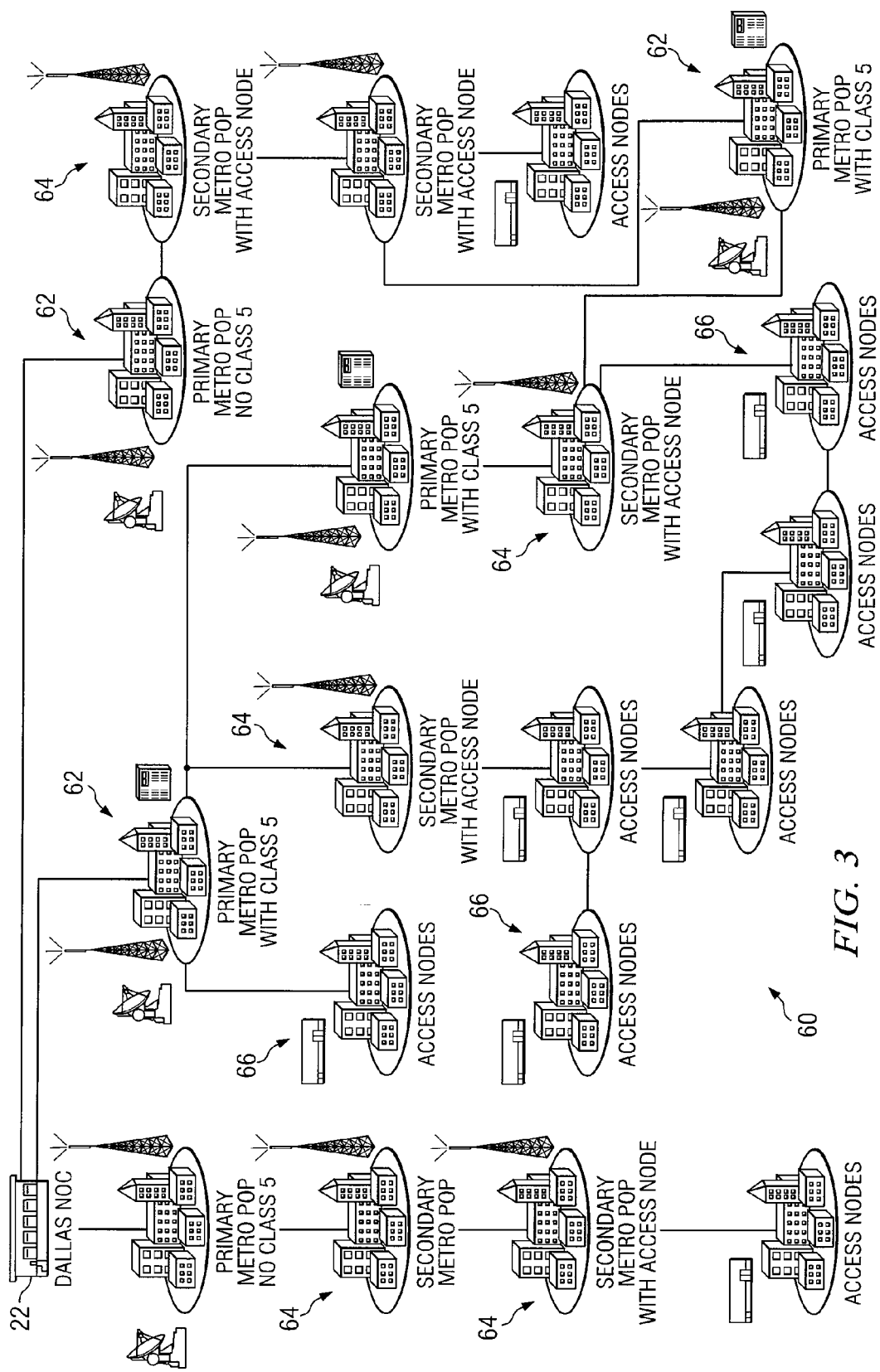
FIG. 3 illustrates an exemplary medium-range distribution system within an exemplary network infrastructure.

FIG. 3 illustrates an exemplary medium-range distribution system 60 of network 10. Again, although distribution system 60 is described as a medium-range system, distribution system 60 may be appropriate for distribution areas of any suitable size. In a particular embodiment of network 10, there are three categories of metro POPs 52. Although three exemplary categories of metro POPs 52 are described, it should be understood that any appropriate configuration may be used and the metro POPs 52 described may be modified as appropriate for certain applications. The exemplary categories of metro POPs 52 are primary metro POPs 62, secondary metro POPs 64, and telephony access POPs 66 (which may be referred to as access shelves or telephony access nodes). Telephony access POPs 66 may include access nodes and other telephony gear that is remotely managed by a metro POP 52. The access nodes may the same type of equipment as the equipment physically located within a metro POP 52. Therefore, telephony access POPs 66 are remotely managed components of MPOPs 62 and 64. In one embodiment, the functionality of each metro POP 52 is hierarchically inherited from the lowest level and least functional metro POP 52, in this case a telephony access POP 66, through a secondary metro POP 64, and up to a primary metro POP 62 that is capable of supporting all potential metro POP functions.

In a particular embodiment, primary metro POPs 62 and secondary metro POPs 64 provide video programming, Internet, telephony, online games, application, and other media services to site POPs, described below, for distribution to customer premises 12. Primary metro POPs 62 may provide more extensive video programming, telephony, data, application, and other network services than secondary metro POPs 64. These extended services may be provided by a Primary metro POP 62 as a service to a secondary metro POP 64. For example, a primary metro POP 62 may include a satellite dish farm used to receive television channel broadcasts from satellites, whereas secondary metro POPs 64 coupled to the primary metro POP 62 might only include one or more off-air television antennas for receiving local television broadcasts. In this case, the primary metro POP 62 may serve as the source for satellite programming (for example, cable channels such as CNN™ and HBO™) for a number of customer premises 12, but these customer premises 12 may receive local television channels from a local secondary metro POP 64.

Similarly, primary metro POPs 62 may be able to provide more extensive telephony services than secondary metro POPs 64. For example, a primary metro POP 62 may include a Class 4 and/or 5 telephone circuit switch coupled to PSTN 16 that interfaces with the IP telephony system to allow customer premises 12 in network 10 to communicate with users of the domestic and international PSTN 16. A secondary metro POP 64 might only include a telephony access POP 66 that provides network 10 with access to telephony services, but that is not directly connected to PSTN 16. In this case, telephone communications from customer premises 12 served by the secondary metro POP 64 that are directed to users of PSTN 16 are forwarded to a primary metro POP 62 for transmission over PSTN 16.

One or more telephony access POPs 66 may be coupled to a telephone switch in a metro POP 62 or 64. These telephony access POPs 66 may be located external to metro POPs 62 or 64 to provide customer premises 12 not coupled to a site POP with access to telephone services. Therefore, telephony access POPs 66 provide an extension of PSTN 16 to customer premises 12. However, unlike PSTN 16, this extension is part of network 10 and managed by a NOC 22. In addition to telephony access POPs 66, network 10 may also provide Internet services and television programming using access nodes that perform a similar function as telephony access POPs 66. For example, telephony and complex media services may be provided by a primary metro POP 52 and a television access node located remotely from the primary metro POP 52 may be used to provide local off-air antenna programming. Such use of a television access node (or similar use of an Internet access node) may occur primarily in relatively high density markets.

It should be noted that although not illustrated in FIG. 3, one or more primary metro POPs 62 and secondary metro POPs 64 may be connected to a number of NOCs 22 to provide redundant paths for NOC services, as illustrated in FIG. 2. This redundant path can be accomplished either by a direct connection or by an indirect connection routed through other metro POPs 52. Furthermore, metro POPs 62 and 64 may be coupled to metro POPs 62 and 64 in another area. This is an extension of the mesh architecture strategy extrapolated at its highest level and applies to the deployment of regional, national, and international network extensions to the network. As described above, metro POPs 62 and 64 may be interconnected in any suitable manner and number to provide redundant paths for voice, video, and data communications. As the number of redundant paths increase, the reliability of network 10 will also increase. The networking technology used to couple metro POPs 62 and 64 may be similar to the technology used to connect the NOCs 22 (for example, IP packets communicated over Gigabit Ethernet channels that are multiplexed over fiber optic cables using DWDM). However, in a particular embodiment, communications between metro POPs 62 and 64 and telephony access POPs 66 may rely on either IP (over Ethernet or otherwise) or traditional PSTN communication protocols. If PSTN communication protocols are used, a gateway may be used between telephony access POP 66 and the devices at customer premises 12 served by the telephony access POP 66. This gateway converts between the PSTN and IP communication protocols since the content ultimately delivered to the devices is preferably in IP packets. Through the use of analog gateways, site POPs, and customer premises 12 may be directly connected to telephony access POPs 66 to obtain telephony services. This type of connection is typically deployed to provide fail-over support for temporary and emergency voice and data telephony services should a short-term, long-term, or catastrophic failure of the primary network segment occur.

Customer premises 12 are typically not directly connected to metro POPs 62 and 64 (although they can be). As described above, primary metro POPs 62 and secondary metro POPs 64 may each contain equipment designed to serve an entire city, and it would be inefficient and expensive to directly connect each customer premises 12 to metro POPs 62 and 64. Instead, the content and services provided by metro POPs 62 and 64 are communicated to site POPs that are connected to metro POPs 62 and 64. Site POPs extend network 10 into residential neighborhoods, commercial areas/buildings, and small outlying communities. Therefore, the site POPs serve as distribution points for the content and services provided by metro POPs 62 and 64. Site POPs are described in greater detail below with reference to FIGS. 5 and 6.

Figure 4A:
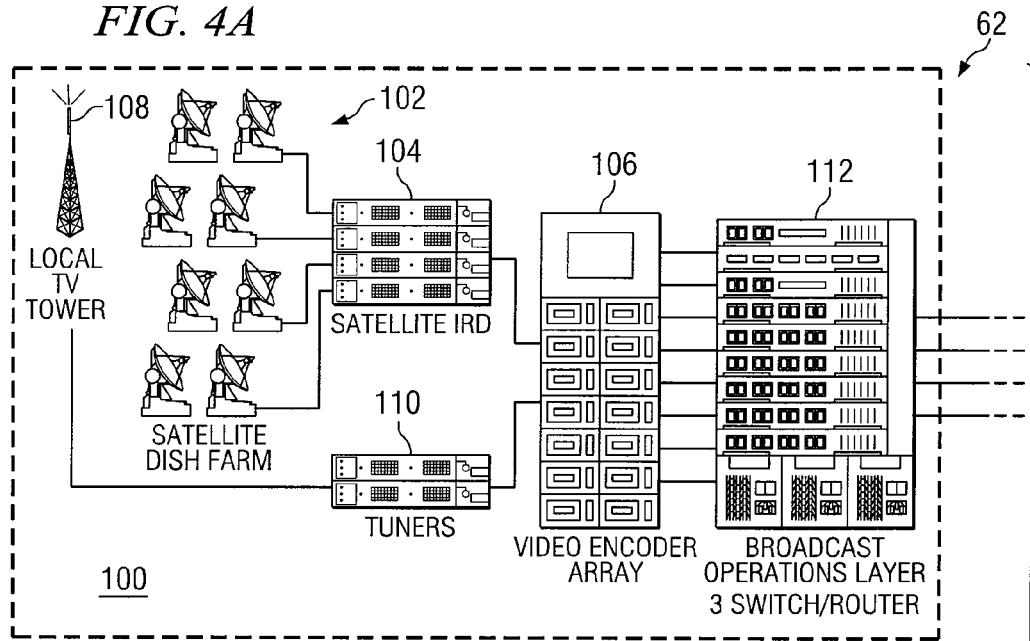
FIGS. 4A and 4B illustrate an exemplary primary metropolitan point-of-presence (POP)
Figure 4A:
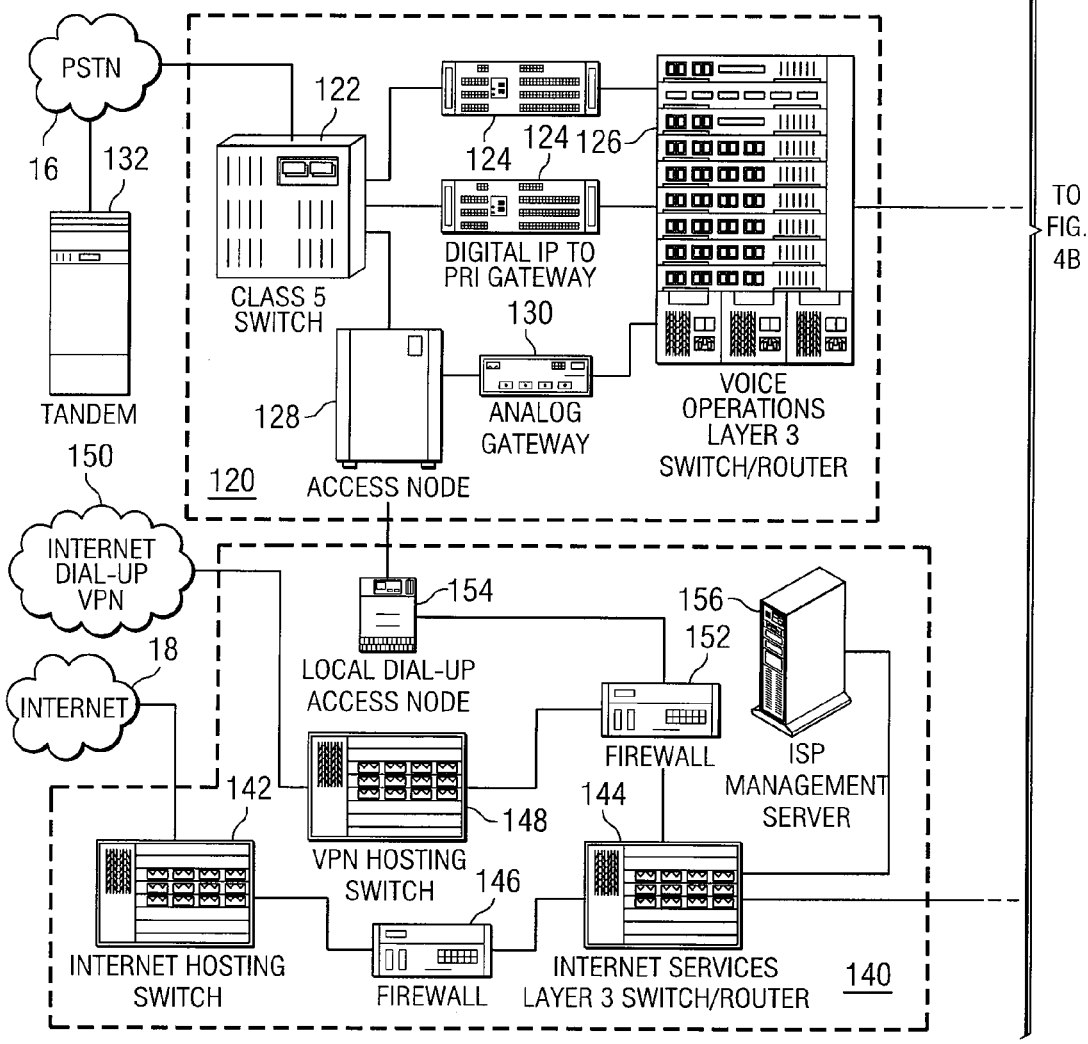
Figure 4B:
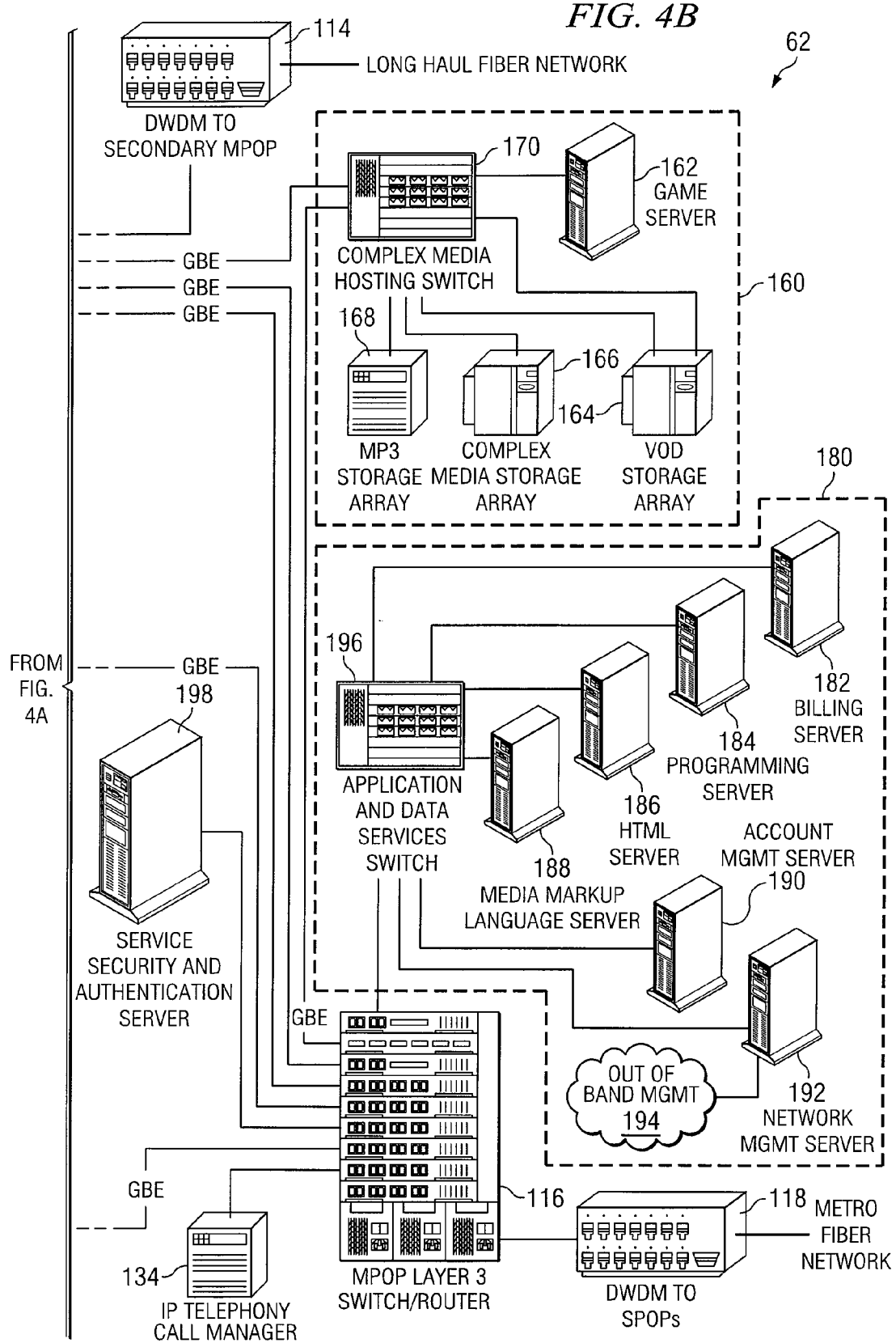

FIGS. 4A and 4B illustrate an exemplary primary metro POP 62. Primary metro POP 62 includes equipment operable to provide the various voice, video, and data services described above. Although primary metro POP 62 is described, similar components may be included in secondary metro POPs 64. In one embodiment, the exemplary equipment in metro POP 62 may be categorized into five different sections that each provide a different type of service or service(s). In a particular embodiment, the sections are coupled using Gigabit Ethernet connections between various switches and/or routers; however, any other appropriate connections may be used. The first section is a video programming services section 100. Section 100 includes one or more satellite dishes 102 (which may be collectively referred to as a satellite dish farm) coupled to one or more integrated receiver and decoders (IRDs) 104 that process the satellite transmissions received by satellite dishes 102 for viewing. IRDs 104 are coupled to a video encoder array 106 that receives video signals that have been processed by IRDs 104 and that encodes the video signals into a digital video format and encapsulates the digital video into network packets for unicast, broadcast, and/or multicast communication over network 10. For example, video encoder array 106 may use compression/encoding standards such as the collection of standards provided by the Moving Picture Experts Group (MPEG). Section 100 also includes one or more television antennas 108 that may be used to receive local television broadcast signals. These signals are communicated to one or more tuners 110, which then communicate the signals to video encoder array 106 for communication over network 10. Television programming may also be received from digital or tape storage systems, switched (but not broadcast) linear video or audio sources, or any other appropriate sources.

Once the video signals from IRDs 104 and tuners 110 have been encoded using video encoder array 106, the signals are communicated to a broadcast operations switch/router 112 (a "switch/router" may perform Ethernet switching and/or IP routing functions) that may communicate the signals directly to a metro POP switch/router 116 or to a DWDM multiplexer 114 for communication over network 10 to another primary metro POP 62 or a secondary metro POP 64. The video signals may be communicated to another primary metro POP 62 or a secondary metro POP 64, for example, if that metro POP 62 or 64 does not provide video services to its respective site POPs or if its video programming services section 100 has failed. For example, a secondary metro POP 64 may include antennas 108, but not satellite dishes 102. In this case, satellite programming may be provided to secondary metro POP 64 by a primary metro POP 62. Broadcast operations switch/router 112 may also communicate the video signals from video encoder array 106 to metro POP switch/router 116 that then communicates the signals to a DWDM multiplexer 118 for communication to a site POP served by primary metro POP 62. The site POP may then communicate the video signals to a customer premises 12, where the video signals are decoded for viewing (for example, by computer 32 or set-top box 34).

Since a particular television channel or other video programming service may need to be delivered to multiple customer premises 12 simultaneously, broadcast operations switch/router 112 may communicate the contents of the channel to customer premises 112 using IP multicast (or similar protocols that replicate an instance of a data packet and distribute it to all directly connected distribution paths which may repeat this process until reaching the customer premises). For example only, the details of the television distribution model are described using the TCP/IP, IPv4 and IPv6 multicast methods. A multicast is a single data stream that is intended for particular devices that have joined an appropriate "multicast group." Like an IP broadcast, the source device, such as video encoder array 106, generates a single data stream that is directed to the broadcast switch/router 112. Unlike a broadcast, however, a multicast-enabled router forwards a multicast message to a particular network segment only when there are members of the multicast group on that network segment. When the last member device in a network segment leaves a multicast group, the router "prunes" the multicast data stream associated with that group and stops forwarding the multicast stream to that segment. Therefore, network segments with no multicast group members do not have to communicate the multicast traffic. Using multicast, bandwidth is saved because only a single message is sent from the source device, and this message is only transmitted to devices that are members of the particular multicast group.

In order to send IP multicast packets, the source device specifies a destination address that represents the multicast group. This destination address may be referred to as a multicast group address. To receive multicast packets, an application on a device wanting to participate in a multicast group, such as a set-top box 34 at a customer premises 12 wanting to join the multicast group that is associated with HBO™, requests membership in the multicast group. This membership request is sent to the router serving the requesting device and, if necessary, the request is sent to intermediate routers in network 10 coupling the requesting device and the metro POP 62 or 64 providing the multicast stream.

When a multicast message is sent from a source device, routers in network 10 deliver the requested incoming multicast packets to each participating device's local router, such as a router at a site POP. The router, which has mapped the multicast group address to its associated hardware address (for example, an Ethernet address), builds the message (for example, an Ethernet frame) using the multicast group address. The devices belonging to the multicast group monitor this address and retrieve the incoming multicast messages. To support IP multicast in a particular embodiment, the source and destination devices and the network structure between the devices, including intermediate routers, are multicast-enabled. The source and destination devices have support for IP multicast transmission and reception and have hardware and software to communicate requests to join multicast groups and receive multicast communications. The devices may also include IP multicast application software and network interface cards which filter for Ethernet addresses mapped from IP multicast addresses.

Multicast sources and destinations may be organized into logical multicast domains. A multicast domain is a collection of multicast sources that deliver satellite-collected or antenna-collected programming to a collection of multicast receivers located at customer premises 12. Multicast domains are used to manage, isolate, and restrict traffic from sources connected to network 10. An example of this includes the method by which network 10 addresses the problem of preventing the multicast of the radio frequency broadcast of a local television affiliate licensed in one geographic area from being distributed in another geographic area of a similarly licensed local television affiliate. To prevent this, the multicast of the Dallas network affiliate for ABC (WFAA) may be part of a Dallas local affiliate multicast domain and customer premises 12 in Los Angeles may be included in a different multicast domain so that they are unable to view WFAA's television programming. Likewise, the Dallas domain would be unable to view the multicast of the Los Angeles ABC affiliate (KABC).

While multicast domains are used as a tool for restricting and controlling multicast sources and destinations, they can also be used to improve the reliability of television programming service in network 10. This may be accomplished through the management of multicast domains to allow for the overlap of domains, the expansion or contraction of domains, the use of alternative transport systems, and the routing of multicast streams using inter-domain routing protocols. This concept may applied, for example, to off-satellite programming (although it may also apply to off-antenna programming). As an example of how this concept can impact the reliability of network 10 to deliver television programming, it can be applied to the problem of localized rain fade due to precipitation or fog. Most satellite systems are unable to receive the satellite signal during these weather events and thus service is interrupted. In the event that a metro POP 52 has either a pending weather event or is experiencing an active weather event, all multicast receivers dependent upon that metro POP 52 for television programming could, during the event, request multicast programming from a pre-determined alternative domain not affected by the weather event so as to receive the same programming without interruption.

Network 10 may also use inclusion and exclusion lists managed by provisioning servers and customer-managed agents to provide or restrict access to multicast sources and/or multicast domains. Inclusion and exclusion lists are distributed and used by the network as part of a permissions system that provides the network 10 with mechanisms to solve problems with theft of service, parental control, and programming blackouts.

Still referring to FIGS. 4A and 4B, primary metro POP 62 also includes a telephony services section 120. Section 120 includes a Class 5 telephone switch 122 that is coupled to PSTN 16. Switch 122 is coupled to one or more gateways 124 that convert signals from PSTN 16 into a format appropriate for communication over network 10 and that convert signals from network 10 into a format appropriate for communication over PSTN 16. For example, gateways 124 may include digital gateways that convert Integrated Services Digital Network (ISDN) signals to IP packets, and vice versa. Gateways 124 are coupled to a voice operations switch/router 126 that transmits telephone signals to and receives telephone signals from metro POP switch/router 116. Metro POP switch/router 116 transmits the telephone signals to and receives telephone signals from DWDM multiplexer 118, which is coupled to one or more site POPs. Voice operations switch/router 126 may also be coupled to DWDM multiplexer 114 to allow transmission and receipt of telephone communications from other metro POPs 62 and 64 and telephony access POPs 66.

Telephony services section 120 may also include an access node 128 coupled to switch 122. Access node 128 provides local dialup connectivity to telephone switch 122 and, using an analog gateway 130 and voice operations switch/router 126, to customer premises using the IP telephony services. Access node 128 is coupled to voice operations switch/router 126 using analog gateway 130 that converts between the analog communication format used by PSTN 16 and the IP protocol used by network 10. Access node 128 is also coupled to a local dial-up access node 154, described below.

Telephony services section 120 may be used to enable telephone communications between a customer premises 12 on network 10 and a user of PSTN 16 not associated with a customer premises 12 connected to network 10. In addition to traditional telephone calls, such telephone communications may include video services associated telephone communications, such as video conferences, and any other related voice and/or video communications, including simultaneous integrated voice, video, and data communications. The user of PSTN 16 may be located in the same Local Access Transport Area (LATA) as primary metro POP 62, in which case the telephone communications between the user and primary metro POP 62 may be facilitated over PSTN 16 by a Local Exchange Carrier (LEC). Alternatively, a tandem switch 132 may be used to enable communications with users of PSTN 16 in other LATAs. In this case, a telephone communication from a customer premises 12 served by primary metro POP 62 may be communicated from the site POP serving the customer premises 12 to metro POP switch/router 116 and then to voice operations router 126 for communication to PSTN 16 using switch 122 (and a gateway 124 or 130). However if the destination of the telephone communication is not in the LATA or other local calling area in which primary metro POP 62 is located (for example, long distance charges would apply to the call), it may be advantageous not to communicate the telephone communication to PSTN 16 using switch 122 in primary metro POP 62. Instead, network 10 may be used to eliminate or reduce long distance telephone charges by communicating the telephone communication to another primary metro POP 62 (or any other appropriate type of POP 62, 64, or 66) located in the local calling area of the destination. The telephone communication may then be transmitted to PSTN 16 for communication locally to the destination. In this manner, long distance use of PSTN 16 is avoided.

IP telephone communications in network 10 are controlled by one or more call managers 134. Call manager 134 establishes telephone communications between a customer premises 12 on network 10 and one or more other customer premises 12 or one or more users of PSTN 16 not associated with customer premises 12. For telephone communications between customer premises 12, call manager 134 establishes a call between an IP telephone 38 or other appropriate device at each customer premises 12. For telephone communications between a customer premises 12 and a user of PSTN 16, call manager 134 establishes a call between an IP telephone 38 or other device at customer premises 12 and a gateway 124 or 130 though which network 10 is coupled to PSTN 16. These telephones, gateways, or other appropriate devices will typically each have an IP address, and call manager 134 establishes the telephone communication by instructing the devices to communicate with each other using their respective IP addresses. If a gateway 124 or 130 is used, gateway 124 or 130 may communicate telephone communications from a customer premises 12 to the appropriate user of PSTN 16 according to a telephone number of the user supplied to switch 122. Since the communications between customer premises 12 (and possibly one or more gateways 124 or 130) are between a limited number of devices, IP unicast may be used to communicate the packets associated with the telephone communication between the devices. However, IP multicast may be used when there are multiple participants, such as in a conference call or video conference. Call manager 134 is also responsible for managing calling features. Examples of calling features are caller identification (including caller labeling), call waiting, and other telephony class features. Call manager 134 includes the ability to create new class features and to combine existing class features to create new services for the customer.

In addition to video programming services section 100 and telephony services section 120, primary metro POP 62 also includes an Internet services section 140. Section 140 includes an Internet hosting switch 142 that provides access to Internet 18 and to intranets and extranets. Internet hosting switch 142 is coupled to an Internet services switch/router 144 that communicates IP packets between Internet 18 (as well as intranets and extranets) and customer premises 12 on network 10. A firewall 146 may be positioned between hosting switch 142 and Internet services switch/router 144 to provide security and to prevent unauthorized access of network 10. Internet services may be extended to complement IP telephony services. For example, push data services (for example, a stock ticker or weather services), advertisements, and instant coupons may be displayed randomly or at scheduled intervals on a Internet web browser that is integrated into a customer's IP telephone.

Section 140 may also include a virtual private network (VPN) hosting switch 148 that is coupled to and provides access to a VPN 150. In a particular embodiment, VPN 150 is a private data network created using the public telecommunications infrastructure that maintains privacy through the use of a tunneling protocol and other security procedures. Unlike Internet 18, access to VPN 150 may be limited to particular users. VPN hosting switch 148 is coupled to Internet services switch/router 144 to provides customer premises 12 with access to VPN 150. A firewall 152 may be positioned between VPN hosting switch 148 and Internet services switch/router 144 to provide security and to prevent unauthorized access of network 10.

Internet services section 140 may also include a local dial-up access node 154 that allows customer premises 12 to gain access to Internet 18 using PSTN 16. Dial-up access node 154 may be coupled to access node 128 to allow customer premises 12 to reach an Internet service provider (ISP) connected to PSTN 16 using a modem (rather than accessing Internet 18 directly through Internet hosting switch 142). The ISP provides customer premises 12 a connection to Internet 18 through PSTN 16. Dial-up access node 154 may be provided as an alternative Internet connection for situations when Internet hosting switch 142 has failed or is otherwise unavailable. Internet services section 140 may also include an ISP management server 156 that provides Internet management services including, but not limited to, Remote Authentication Dial-In User Service (RADIUS), an authentication and accounting system used by many ISPs.

Primary metro POP 62 also includes a media hosting section 160 that includes a collection of one or more servers or other computer systems providing various forms of media to customer premises 12. In one embodiment, these servers may include a game server 162 that provides video games to customer premises 12 (for example, for a limited period of time or on a pay-per-play basis), a video-on-demand (VOD) storage array 164 that provides movies and other video content to customer premises 12 as video-on-demand, near-video-on-demand, or pay-per-view video, a complex media storage array 166, and an MP3 storage array 168 that provides MP3 or, other music files to customer premises 12. Complex media storage array 166 may provide on-demand programming that includes streaming video, audio, and/or data. This server may add "enhanced television" data to video or audio on demand in same way that a media markup language server may add enhancement data to multicast video and audio channels. Hyperlinks may be inserted in the on-demand program so that a user may select a web page associated with the program. On-demand video or audio programs may also be hosted in web pages where further links or scripts may be received from complex media storage array 166. Data formats supported by the complex media storage array 166 may include, but are not limited to, Television Markup Language™ (TVML), Advanced Television Enhancement Forum (ATVEF), MPEG-4 data overlays, Wink™ format, OpenTV™ format, DVB Multimedia Home Platform (MHP), and Canal+ MediaHighway.

Any other appropriate media servers, storage arrays, or other systems may also be included in section 160 instead of or in addition to those listed. Systems 162, 164, 166, and 168 are coupled to a media hosting switch 170 that is coupled to metro POP switch/router 116 so that the various media content may be communicated to customer premises 12. Hosting switch 170 may also be coupled to DWDM multiplexer 114 (for example, using broadcast operations switch/router 112) to provide the various media content to other primary metro POPs 62 and to secondary metro POPs 64 when appropriate.

Furthermore, primary metro POP 62 includes an application and data services section 180 that includes one or more servers or other computer systems for providing selected application and data services to customer premises 12 and for managing network 10. In one embodiment, these systems include a billing server 182 that provides billing services for customer premises 12 (for example, billing for monthly service, VOD, or Internet shopping purchases) and a programming server 184 that maps all incoming or locally generated content (such as channels of video and audio, on-demand content, and multimedia content) to services presented to customers using the channel guide, menu choices or links.

Section 180 may also include an HTML server 186 that provides HTML documents to customer premises 12 for viewing using a web browser and a media markup language server 188 that provides documents formatted for television display and linking. Television markups provided by this server, including but are not limited to Television Markup Language™ (TVML), provide screen graphics and navigation mechanisms appropriate for televisions with either a remote control or wireless keyboard/mouse. Media linking languages provided by media markup language server 188 include, but are not limited to, TVML and Advanced Television Enhancement Forum (ATVEF). Media linking is one method of creating "enhanced television" by inserting hyperlinks in a television program, movie, audio program, or other program that a user may select to view a web page associated with the program.

Video or audio programs (such as radio programming) may also be hosted in web pages where further links or scripts may be received from media markup language server 188 as TVML, ATVEF, or other languages.

Section 180 may further include an account management server 190 that provides selected management functions associated with customer accounts and a network management server 192 that may be used to manage the provision of content and services to customer premises 12. Network management server 192 also stores information to perform network fault management and self-healing. Network management server 192 may be coupled to one or more out-of-band management devices 194 associated with out-of-band networks. Network management server 192 allows the use of management networks not included in the in-band protocols of Internet 18. Furthermore, network management server 192 provides management not just to out-of-band protocols on the same physical infrastructures, but also management of different physical networks (for example, serial port connections between devices). All of servers 182, 184, 186, 188, 190, and 192 and any other appropriate systems, are coupled to an application and data services switch 196 that is coupled to metro POP switch/router 116 to allow communication between the servers, customer premises 12, and any other appropriate locations (such as a NOC 22).

Primary metro POP 62 may also include a service security and authentication server 198 that, in coordination with account management server 190 and network management server 192, stores and distributes information to other network components for the purposes of preventing unauthorized access to services and preventing unauthorized copying of content. Access to content, in video and audio practice, may be referred to as conditional access. Conditional access assures, to a reasonable standard, that customers only receive the proper channel package, that sports content blackout and reverse blackout agreements are honored for a given region, and that undegraded digital copies of video cannot be easily extracted from the system.

The information contained in service security server 198 may be used by the network to implement conditional access using two cooperative methods: interdiction and encryption. Interdiction is a technique where network devices, including but not limited to the metro POP and site POP switches/routers 112, 116, 126, 140, 170, 196, and/or 258, prevent routing of content to specific subscribers or regions based upon one or more access lists, geographic locations, or any other appropriate parameters. Interdiction techniques on the switches may include, but are not limited to, port access lists, multicast join prevention, multicast join to alternate source, and similar techniques applied to virtual local area networks (VLANs) as well as ports of devices. Encryption is a technique where video and audio streams are rendered unplayable by cryptographic techniques under the control of service security server 198. This content can only be rendered playable by cryptographic information distributed by service security server 198 to specific customer premises devices including, but not limited to, set-top boxes 34 and computers 32. Service security server 198 also controls access to other services including data and telephone services.

Although a number of components have been described above as being included in primary metro POP 62, it should be understood that some or all primary metro POPs 62 in network 10 may not include all of the described components. In this case, the content and services provided by any components not included may be provided by other metro POPs 62, 64, and 66 if they are to be provided to customer premises 12. In addition, any other appropriate components not described above may be included. Furthermore, although the components described above are illustrated as having a specific configuration relative to one another, the components may be arranged and coupled in any appropriate manner. For example, router/switches 112, 116, 126, 170, and 196 may be coupled in any appropriate manner to couple primary metro POP 62 to other metro POPs 62, 64, and 66, NOCs 22, site POPs, and customer premises 12. More or fewer routers and/or switches may be implemented as needed.

As is described above, secondary metro POPs 64 may have many similar components described above in conjunction with the exemplary primary metro POP 62. However, as their name implies, secondary metro POPs 64 may include fewer components than primary metro POPs 62 and thus provide fewer services than primary metro POPs 62. A secondary metro POP 64 may be dependent on one or more primary metro POPs 62 for the services not incorporated in the secondary metro POP 64. For example, secondary metro POPs 64 might not include satellite dishes 102 and might instead receive satellite programming from a primary metro POP 62 for delivery to the site POPs served by the secondary metro POP 64. Furthermore, secondary metro POPs 64 might not include a Class 5 telephone switch 122. In this case, telephone signals to and from customer premises 12 served by the secondary metro POP 64 are communicated to PSTN 16 through a primary metro POP 62. Similarly, telephony access POPs 66 communicate telephone communications to PSTN 16 through a primary metro POP 62 (and also possibly a secondary metro POP 64).

Figure 5:
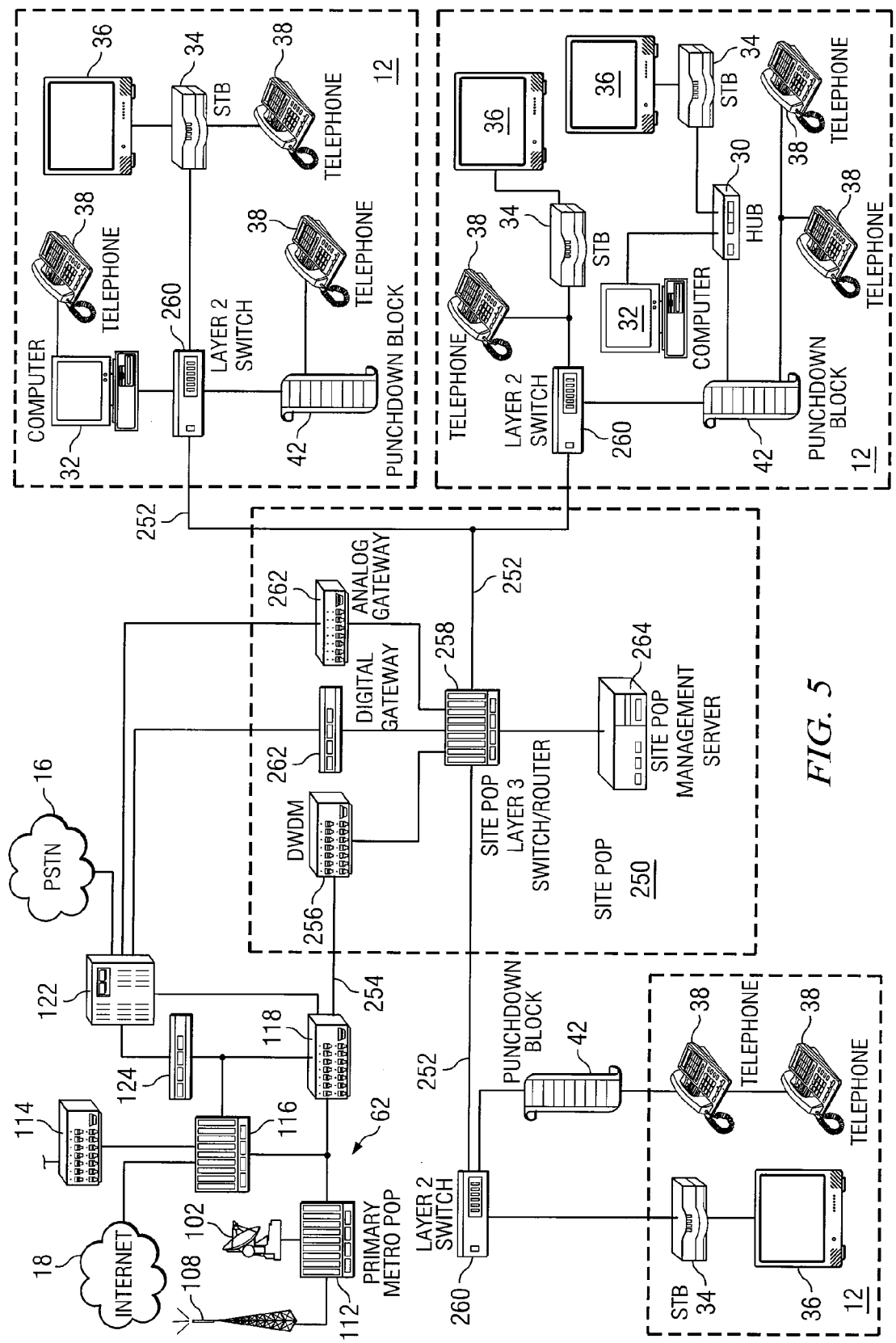
FIG. 5 illustrates an exemplary site POP coupled to a primary metropolitan POP and serving a number of customer premises.

FIG. 5 illustrates an exemplary site POP 250 coupled to a primary metro POP 62 and serving a number of customer premises 12. It should be understood that many other site POPs 250 may be coupled to primary metro POP 62 to serve other customer premises 12. Site POP 250 is designed to serve customer premises 12 that are directly connected to network 10 ("on-net" customer premises 12). One example of customer premises 12 that may be "on-net" are multi-family residential communities (MFRC), such as apartment complexes and condominiums. Individual residences may also be on-net. Single family and multi-family residences that are connected to network 10 using a third party infrastructure, such as an incumbent or competitive local exchange carrier offering xDSL services or alternative last mile delivery strategies, are considered "off-net" customers as described below with reference to FIG. 6. On-net customer premises 12 may be coupled to site POP 250 using fiber optic cable 252 that is part of network 10 and that is similar to one or more fiber optic cables 254 coupling site POP 250 to primary metro POP 62. The capacity of cables 252 and 254 may differ based on the bandwidth required. As described above, the data link layer (Layer 2) protocol used for communications between primary metro POP 62 and site POP 250 in a particular embodiment is Gigabit Ethernet (multiplexed using DWDM). In this embodiment, a type of Ethernet is used for Layer 2 communications throughout network 10. However, Gigabit Ethernet is not always used since the bandwidth provided by Gigabit Ethernet is not always needed. For example only and not by way of limitation, communications between site POP 250 and customer premises 12 might be also be facilitated using Fast Ethernet.

Site POP 250 includes a DWDM demultiplexer 256 that receives multiplexed Gigabit Ethernet channels containing content communicated from primary metro POP 62 and demultiplexes the streams for communication to a site POP switch/router 258. Demultiplexer 256 may also serve as a multiplexer for communications from customer premises 12 to primary metro POP 62. The streams are communicated to site POP 250 (for example, by a metro POP switch/router 116) because their intended destination is one or more devices at one or more customer premises 12 coupled to site POP 250. Based on an IP address associated with each packet, switch/router 258 communicates each packet to a Layer 2 switch 260 (for example, an Ethernet switch) at a customer premises 12 where a device having that IP address is located. Switch 260 then determines an Ethernet address of the device associated with the IP address and communicates the appropriate packets to that device.

As described above, devices to which content may be communicated from primary metro POP 62 include computers 32, set-top boxes 34 associated with televisions 36, IP telephones 38, and any other appropriate devices such as Internet appliances and wireless transceivers for transmission of content to and receipt of content from wireless devices. The devices at customer premises 12 may be coupled to their respective switch 260 and to each other in any appropriate manner. For example only and not by way of limitation, the devices may each be directly connected to a port of switch 260, they may be coupled to another device that is connected to switch 260, they may be coupled to a switch 30 that is connected to switch 260, or they may connected to a punchdown block 42 that is connected to switch 260. Although each customer premises 12 includes a limited number of illustrated devices, it should be understood that each customer premises 12 may have multiple subscribers (for example, each apartment in an apartment complex) and each subscriber may have multiple devices coupled to network 10.

Layer 2 switches 260 may be located at customer premises 12, site POP 250, or any other appropriate location. If a Layer 2 switch 260 is located at customer premises 12, then a Layer 3 (IP) switch/router is typically located at site POP 250 to communicate traffic to the appropriate switch 260. In this situation, the devices at customer premises 12 are coupled to switch 260 using premises wiring, such as Category 5, Category 5E, and Category 6 wiring. Alternatively, Layer 2 switches 260 may be located at site POP 250 and may be incorporated into Layer 3 switch/router 258. In this case, the Layer 3 switch/router 258 provides copper or optical Fast Ethernet ports (or other appropriate Layer 2 connections) to which the devices at customer premises 12 may be connected. However, the distance between site POP 250 and customer premises 12 may be too great to use Category 3, Category 5, Category 5E, Category 6 or other typical premises wiring to connect the devices to switch/router 258. In this case, a point-to-point media converter may be used to receive a 100-Base-T signal (or any other appropriate signal) from Category 5 wiring (or any other appropriate wiring) and convert the signal for communication over a fiber optic cable to a second point-to-point media converter located at or near customer premises 12. The second point-to-point media converter then reconverts the signal for communication over Category 5 wiring (or other appropriate wiring) to the devices at customer premises 12. This technology approach also applies to higher bandwidths such as gigabit or multiple gigabit network speeds.

In addition to demultiplexer 256 and switch/router 258, site POP 250 may also include one or more digital or analog gateways 262 connected to switch 122 of primary metro POP 62. Gateways 262 are coupled to switch 122 using telephone communication lines, such as ISDN lines or twisted pair copper wire, and provide back-up telephony services in the event there is a problem with cable 254 or the equipment involved with IP communications between primary metro POP 62 and site POP 250.

Site POP 250 may also include a site POP management server 264 that provides local management for communication sessions with devices at customer premises 12. Site POP management server 264 provides extended communication services during normal operation of network 10. In the event of a failure to the primary network segment connecting site POP 250 to the rest of network 10, site POP management server 264 may coordinate communications between local devices and an out-of-band management system used to provide access to an out-of-band network. Under normal operating conditions, site POP management server 264 may also collect audit information and can be used to provide selected media services. Site POP management server 264 may also support temporary video and audio media storage for on-demand media applications and may provide local commerce services on an interim basis when such services are offline at an associated metro POP 52 or NOC 22. Site POP management server 264 may also monitor the health of site POP 250 and its connections to customer premises 12 and may communicate any problems back to a NOC 22 using network 10 and/or an out-of-band network. Under duress operations, site POP management server 264 may also be used to diagnose network 10 problems and coordinate local hardware resources to provide backup services for emergency communications, such as "e911" services.

Although FIG. 5 illustrates a site POP 250 serving customer premises 12 coupled directly to site POP 250 using fiber optic cable, customer premises 12 may also be coupled to site POP 250 using any appropriate technique. These techniques include installations where fiber optic cable is provided to the vicinity of customer premises 12 and coaxial or twisted pair cable or other appropriate wiring is used to complete the connection to customer premises 12. Other appropriate techniques include the use of the existing twisted pair copper wire that typically connects customer premises 12 with a central office or other facility associated with PSTN 16. This wiring may be referred to as the local loop. Such an exemplary embodiment is described below.

Figure 6:
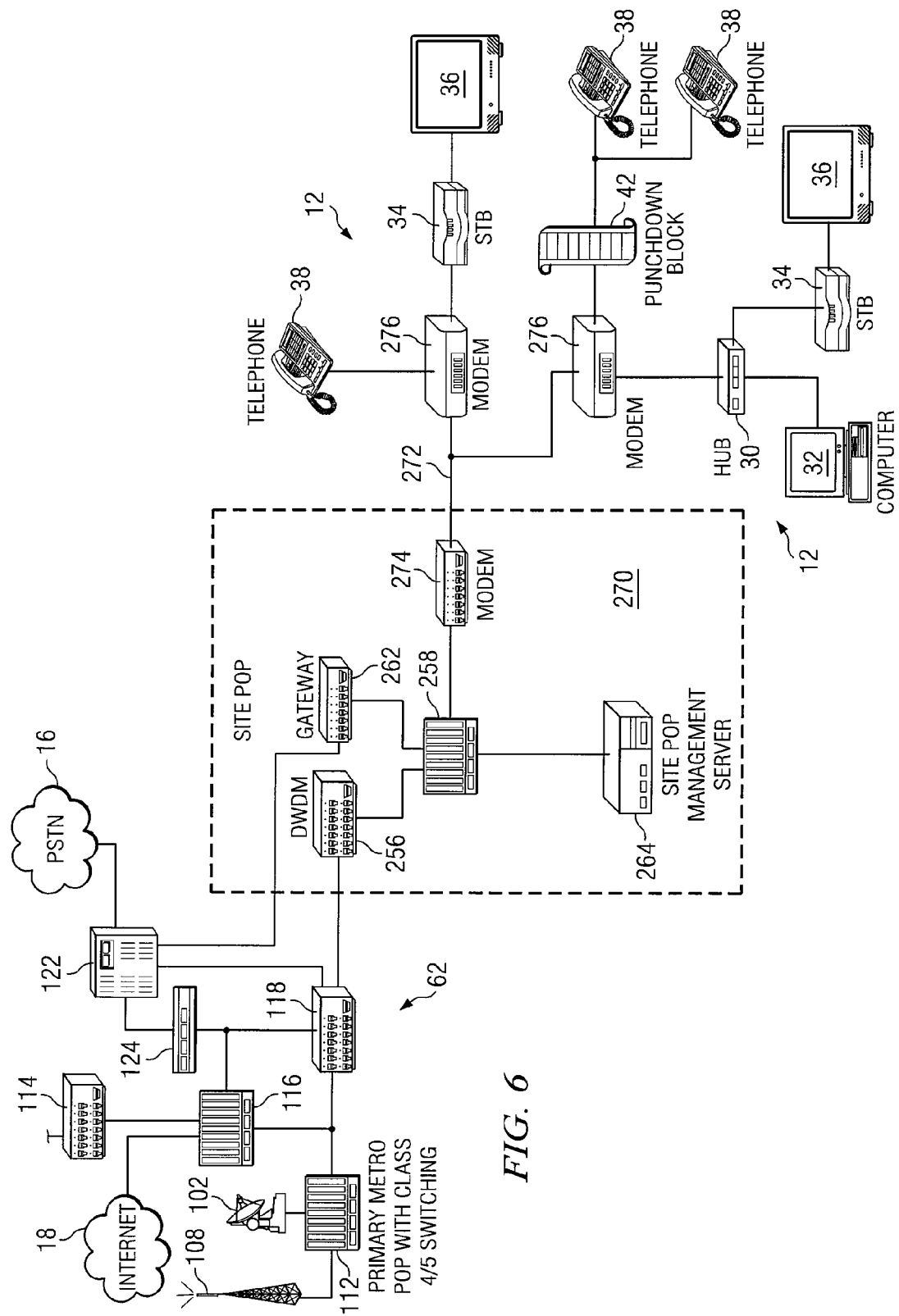
FIG. 6 illustrates an exemplary site POP for providing content to customer premises using local loop telephone wiring.

FIG. 6 illustrates an exemplary site POP 250 for providing content to customer premises 12 using local loop telephone wiring 272. These customer premises 12 are off-net since they are not directly connected to network 10, and instead use local loop wiring 272 to receive content from site POP 250. Site POP 250 may be located in a telephone company central office (for example, in a co-location cage) or an any other appropriate telecommunications facility, such as a digital loop carrier (DLC) located between a central office and customer premises 12. Site POP 250 may include the same type of equipment described above, such as a demultiplexer/multiplexer 256, switch/router 258, gateway 262, and session management server 264. In this embodiment, site POP 250 also includes an additional component, a modem 274, that provides symmetrical or asymmetrical communications in combination with a modem 276 at customer premises 12. Modems 274 and 276 provide the appropriate conversion for communicating content between site POP 250 and customer premises 12 using local loop wiring 272. When content is communicated to customer premises from site POP 250, modem 276 may serve as a switch to communicate content received from site POP 250 to the correct devices at customer premises 12.

Although content may be provided to customer premises 12 using asymmetric communication techniques, symmetric communication techniques allow more on-net services to be deployed on the off-net infrastructure than asymmetric techniques. One symmetric communication technology that may be used is Quadrature Amplitude Modulation over Unshielded Twisted Pair (QAM/UTP) wiring. Although this technology is not the same as Ethernet, it is compliant with the Ethernet standard and thus it can interface with Ethernet without protocol conversions. It should be understood that although QAM/UTP is described, any other appropriate method of transmitting content from site POP 250 to customer premises, such as digital subscriber line (DSL) technology or cable modem technology, may also be used.

In summary, network 10 includes a distributed arrangement of primary metro POPs 62 and secondary metro POPs 64 that are controlled by one or more NOCs 22 and that provide content and services to customer premises 12. As described above, the content and services may be provided to customer premises 12 from metro POPs 62 and 64 using one or more site POPs 250 coupled to each metro POP 62 and 64. Telephony services may also be provided to customer premises 12 using telephony access POPs 66. Through the use of these components of network 10 and the connections coupling these components, network 10 may be used to provide a combination of voice, video, and data content and services to customer premises 12 using a single communications link coupled to customer premises 12 and a common network protocol, such as TCP/IP. As described above, the ability to provide this combination of content and services, using a single network infrastructure, provides many advantages.

FIGS. 7–15 illustrate a user interface menu 300 and exemplary user interface screens associated with the integrated voice, video, and data content provided to customer premises 12 using the components of network 10 described above. In a particular embodiment, user interface menu 300 and the exemplary screens are generated by set-top box 34 using selected combinations of the voice, video, and data information received at customer premises 12. All services may be delivered to the set-top box using Ethernet and other appropriate packet technology. Although selected exemplary screens are illustrated, those skilled in the art will readily appreciate that numerous other screens and associated features may be offered using appropriate combinations of the voice, video, and data information provided over network 10.

Figure 7A:
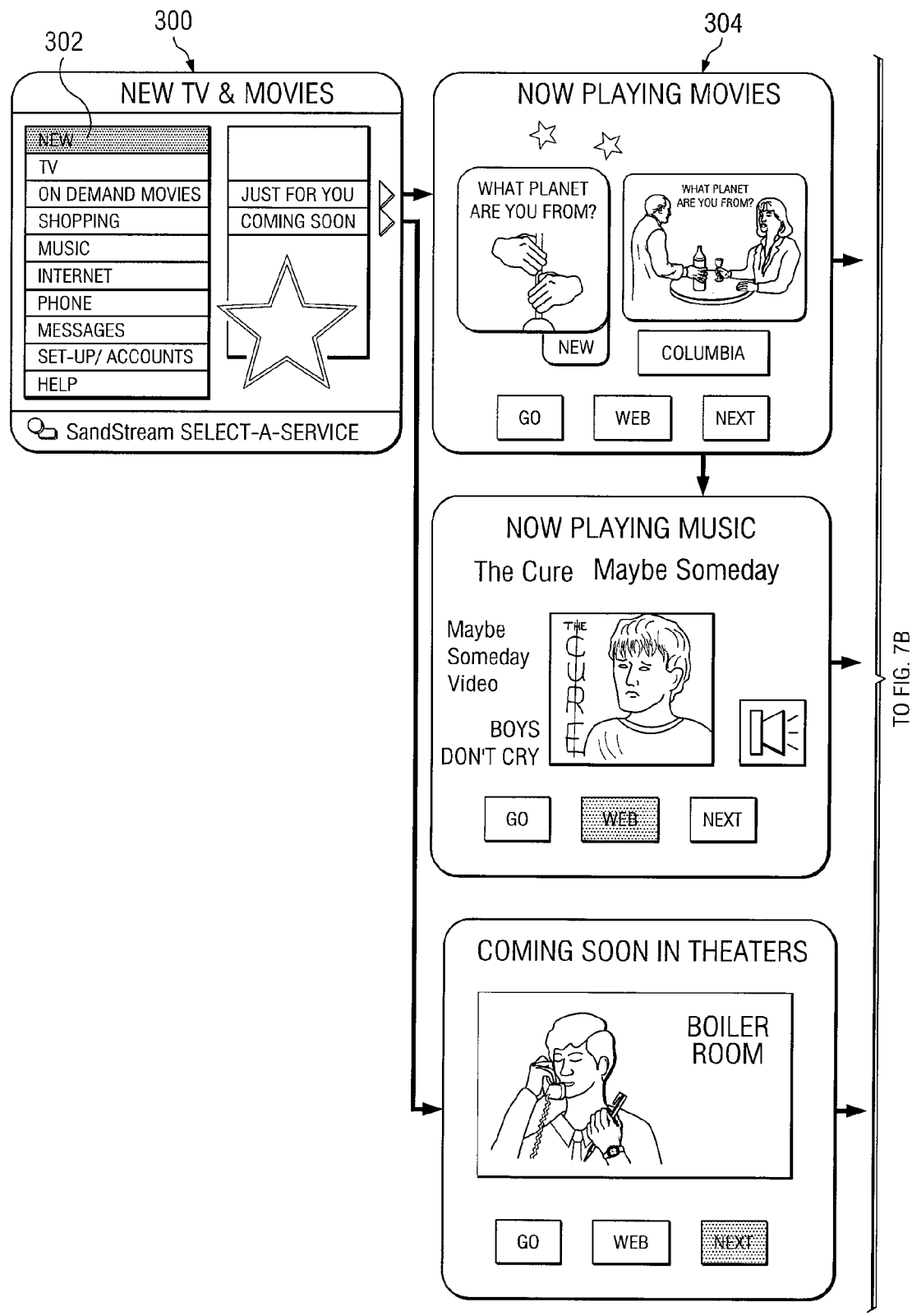
FIGS. 7–15 illustrate an exemplary user interface menu and exemplary user interface screens associated with integrated voice, video, and data provided to customer premises.
Figure 7B:
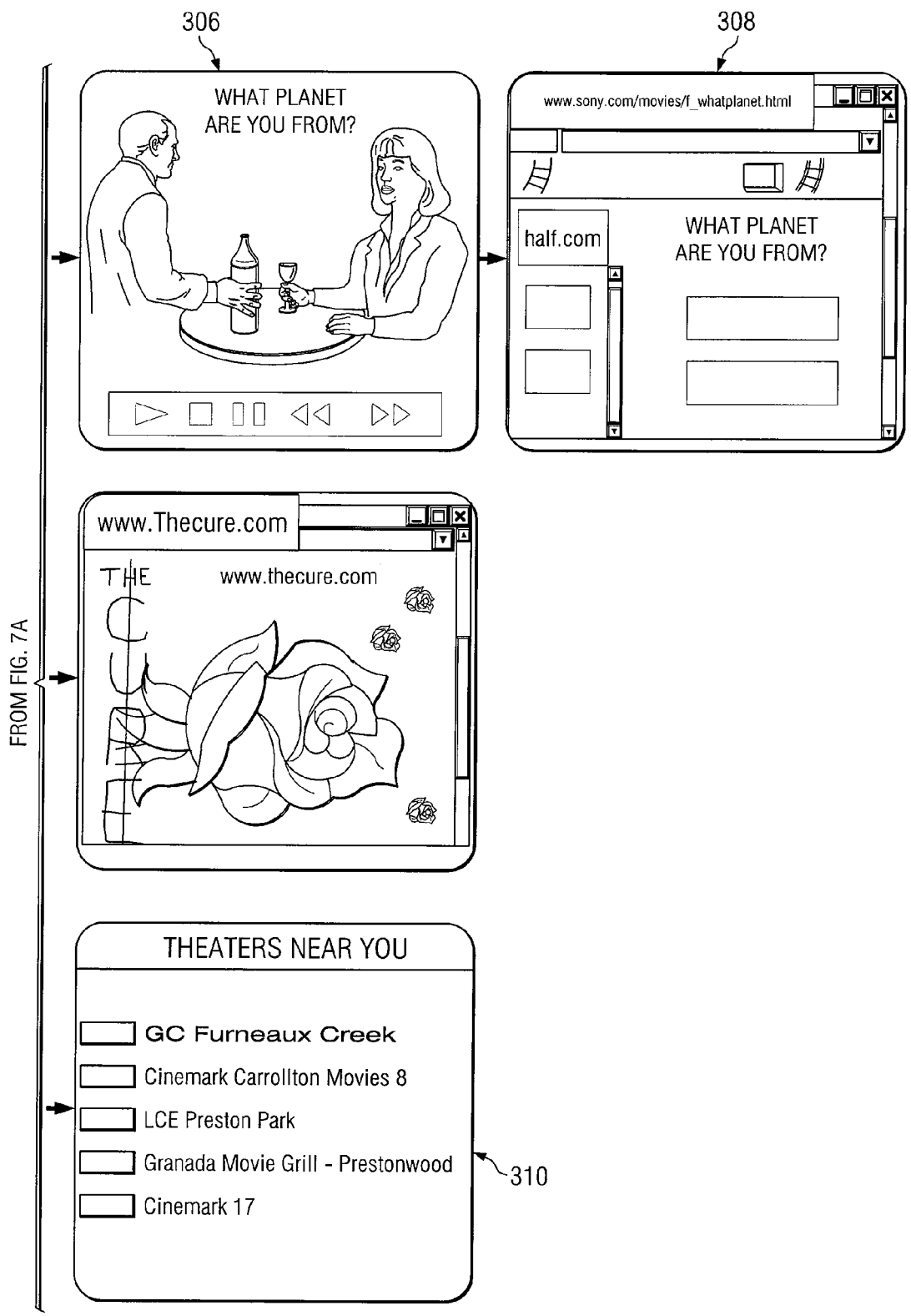
Figure 8:
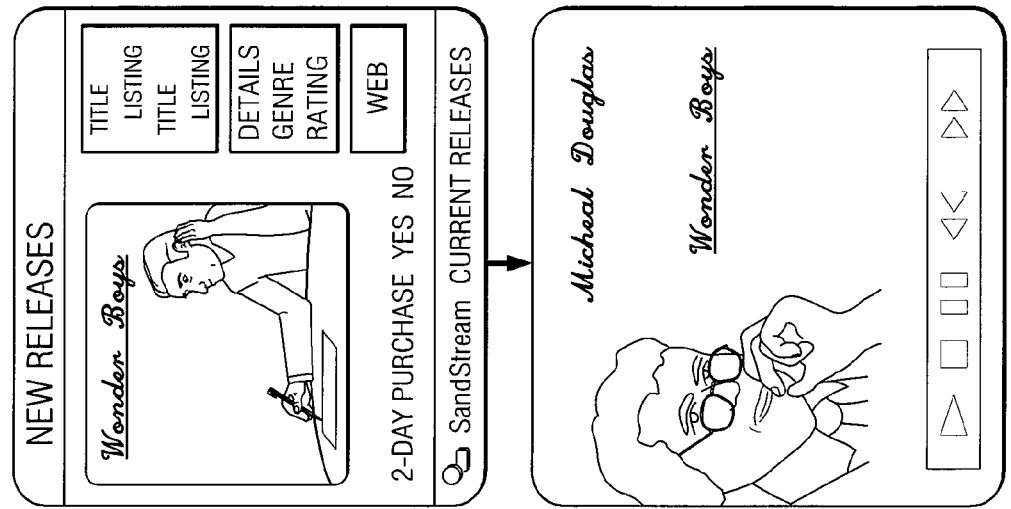
Figure 8:
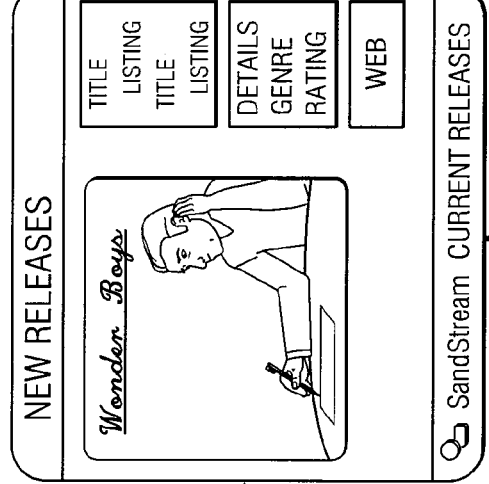
Figure 8:
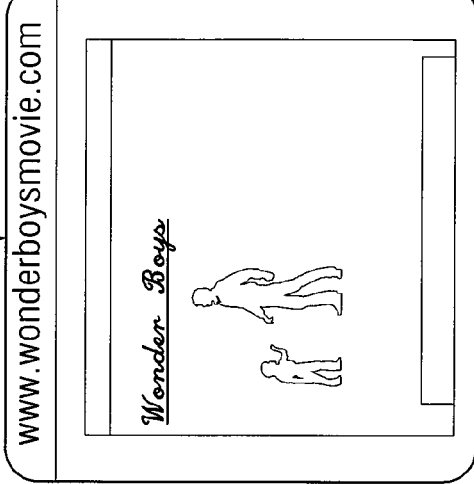

FIG. 7 illustrates exemplary screens associated with a new features option 302 of menu 300. For example, screen 304 identifies a new movie that may be provided over network 10. A user at customer premises 12 may select the movie for viewing (for example, to be provided using VOD storage array 164) using a screen 306 or may receive more information about the movie from Internet 18 on a screen 308. Furthermore, a user may view a list of movies that are currently playing at theatres and may receive information about where a selected movie is playing locally using a screen 310. Data identifying the local theatres that are showing a selected movie may be stored on a data server at a metro POP 62 or 64 (or any other appropriate facility) and may be delivered to customer premises 12 based on location information associated with customer premises 12 that is stored in a database at the metro POP 62 or 64. Other new features, such as new music, may also be presented to the user through option 302. FIG. 8 illustrates exemplary screens associated with a video on demand option 312 of menu 300. The screens provided in association with option 312 are similar to those associated with new features option 302, except that a larger collection of movies may be provided (not just new releases).

Figure 9A:
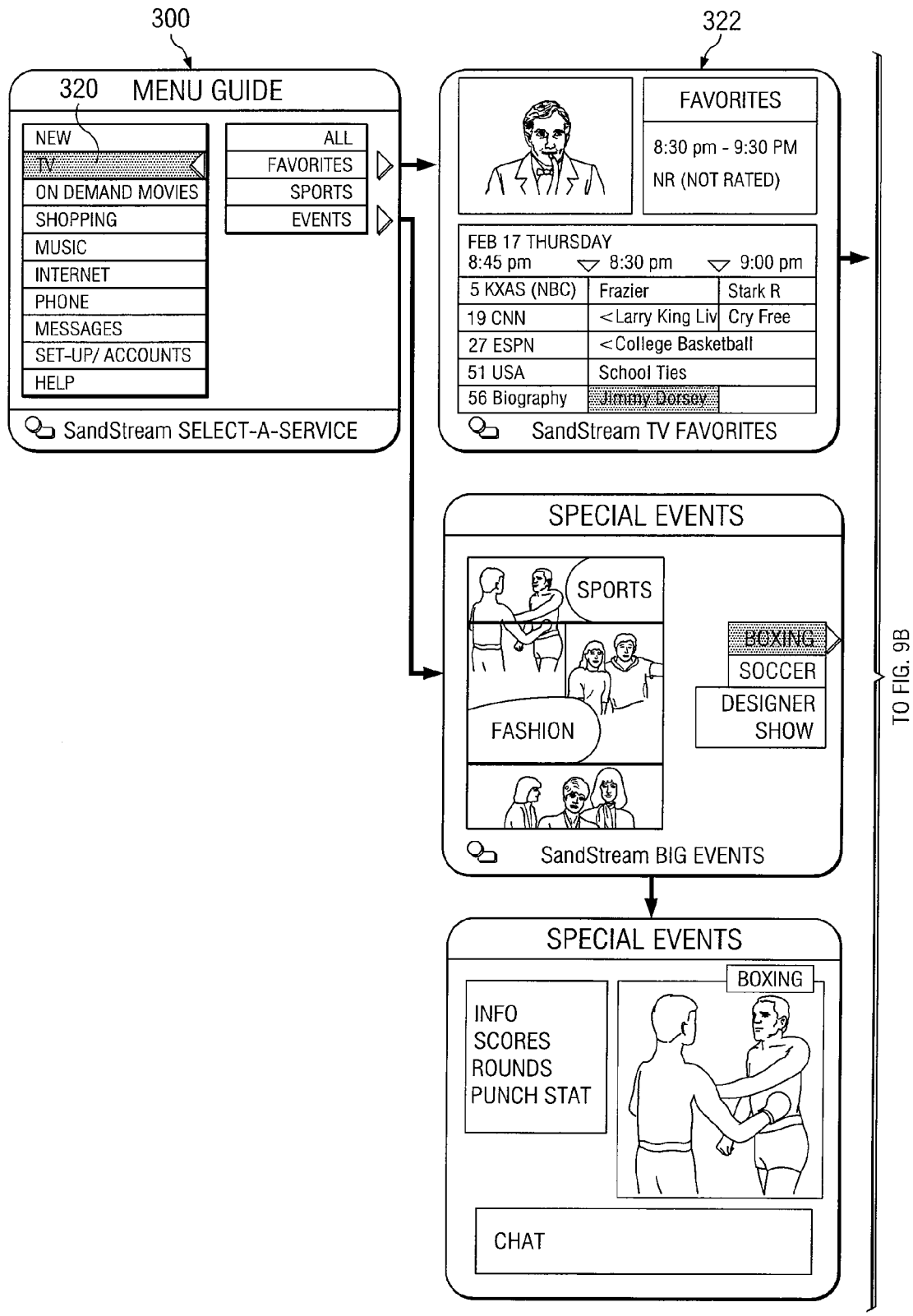
Figure 9B:
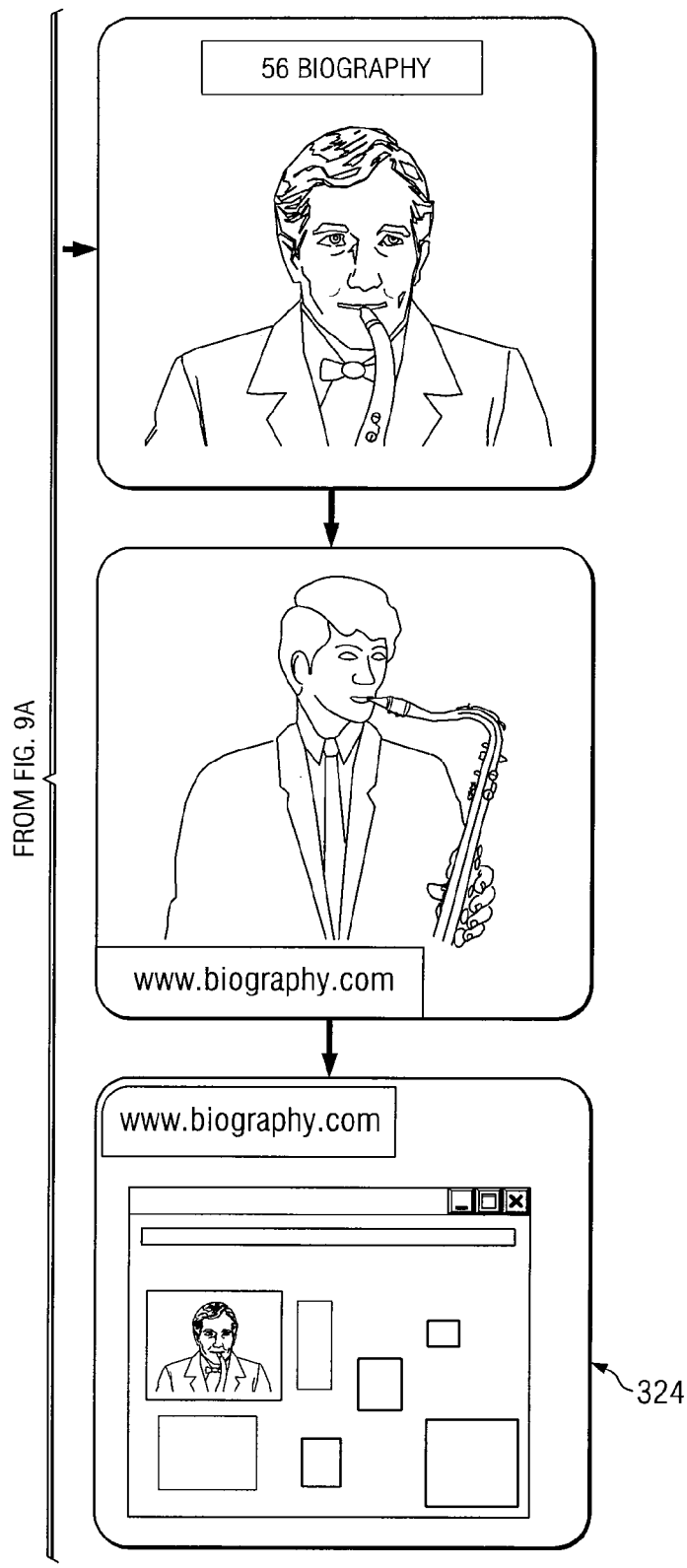

FIG. 9 illustrates exemplary screens associated with a television option 320 of menu 300. A user at a customer premises 12 may be provided with a screen 322 that includes a television guide, as is typical of many cable and satellite television systems. However, a user may also obtain information about a channel or a particular television show from Internet 18 or other appropriate sources by selecting a link that provides information such as shown in screen 324. Furthermore, a user may be provided real-time (or near real-time) data about selected programming, such as sporting events. For example, a user may be provided a screen 326 that allows the user to check the score and other statistics associated with a sporting event.

Figure 10A:
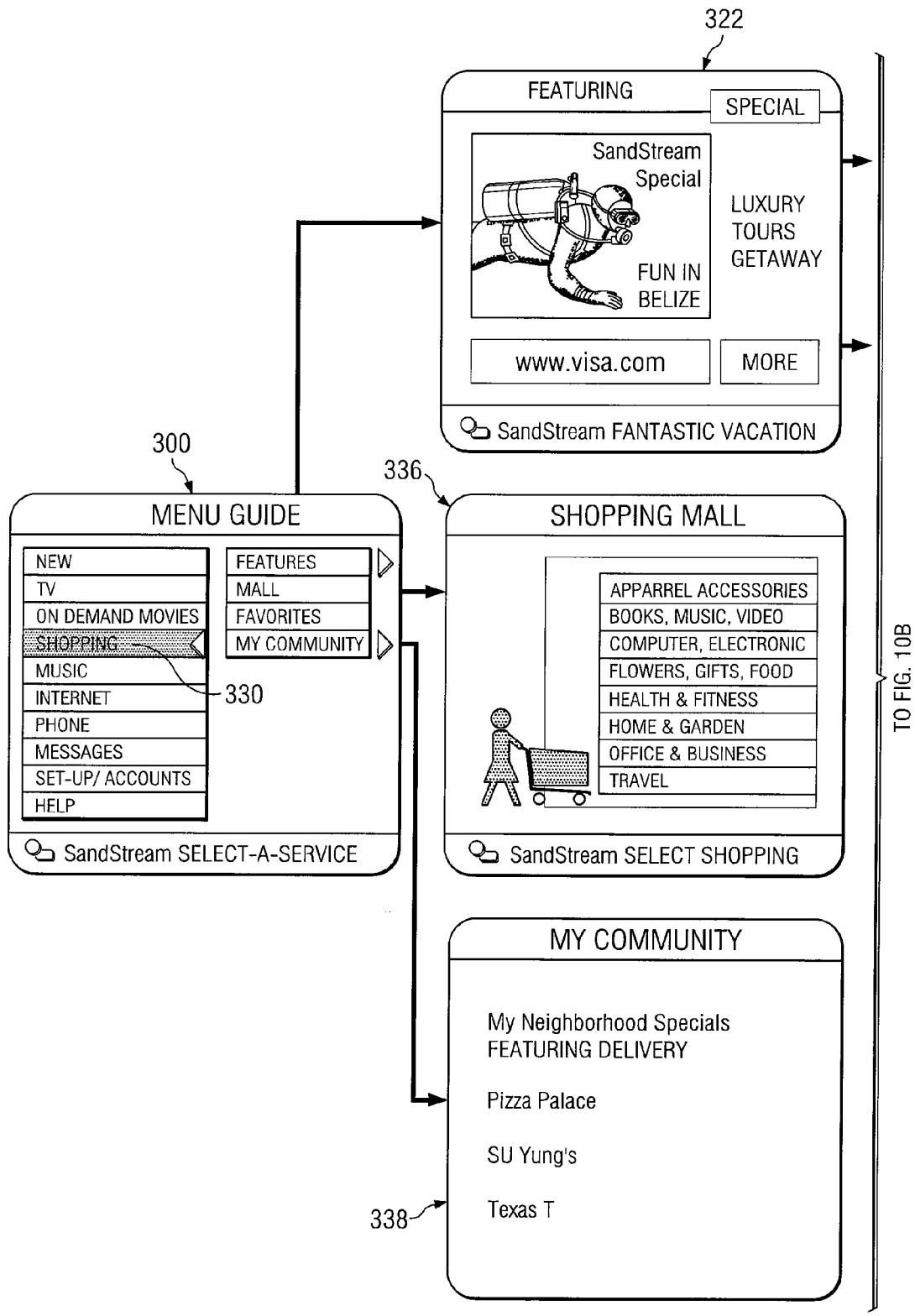
Figure 10B:
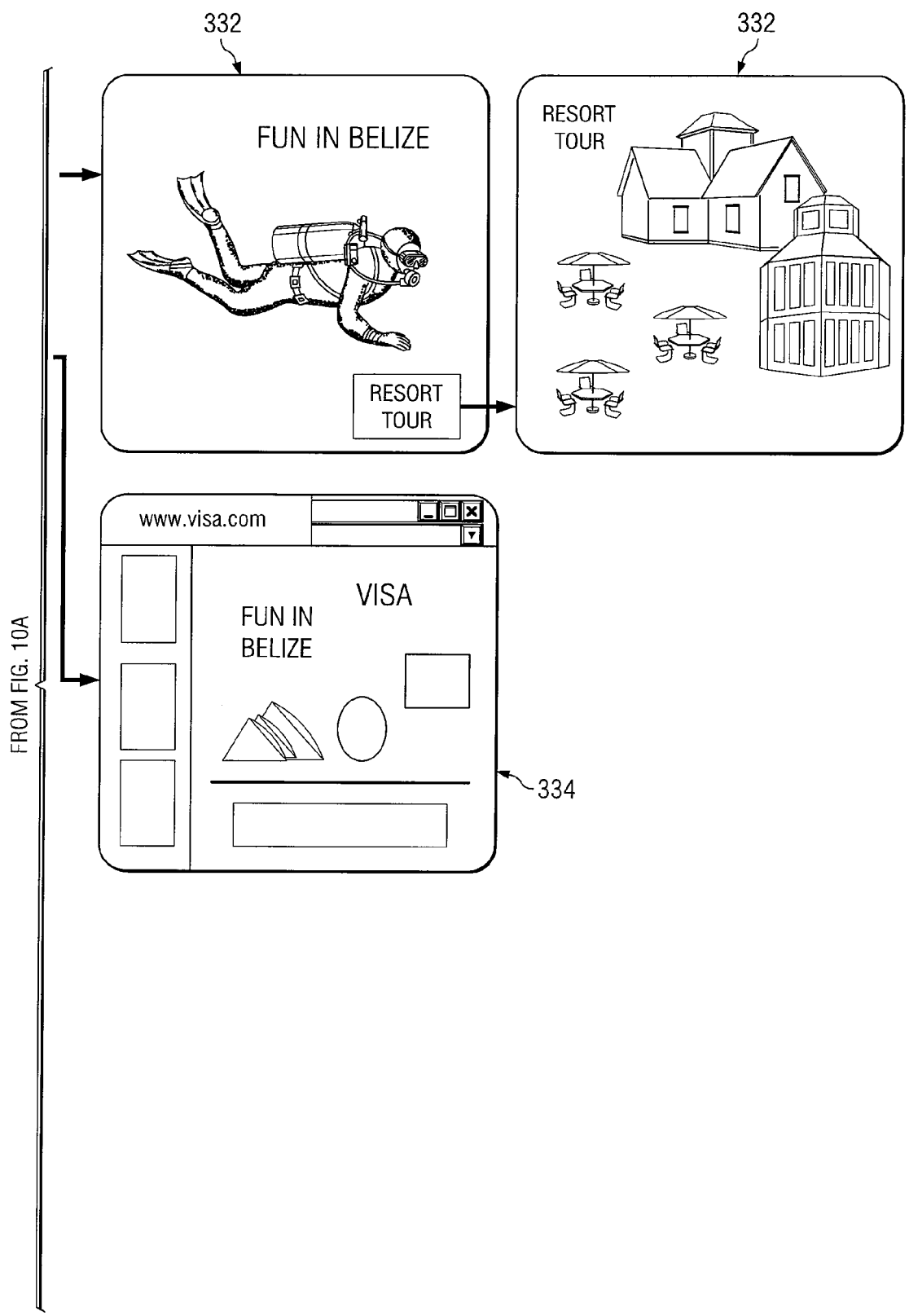

FIG. 10 illustrates exemplary screens associated with a shopping option 330 of menu 300. Various businesses may have a partnership with the entity controlling network 10 and may provide goods and services that are advertised and sold through shopping option 330. Shopping content may be hosted on one or more of the servers located at MPOPs 52 depending on the types of media involved. HTML server 186 and media markup language server 188 may host simple data-only shopping content. Media markup language server 188 may host shopping content that is associated with a multicast video or audio channel. Complex media storage array 166, MP3 storage array 168, and VOD storage array 164 may host shopping pages associated with on demand audio or video. Account management server 190 and service security server 192 may also be involved in transactions managed within the network billing environment. Any other appropriate components of network 10 may also provide shopping services.

A user at customer premises 12 may obtain detailed information about the goods and services available over network 10 using various screens 332. The user may purchase the goods or services over network 10 and be billed through the user's account associated with network 10. A user may also purchase an advertised good or service using Internet 18, as illustrated in screen 334. A user may be provided a screen 336 with a menu of possible shopping options and may also be provided a screen 338 of selected shopping options in the user's local area. For example, based on information about the location of a customer premises 12 accessible from network 10, a user at customer premises 12 may be provided with a list of local restaurants and be able to order food for delivery from those restaurants. The user may then be billed for the food through the user's account associated with network 10.

Figure 11A:
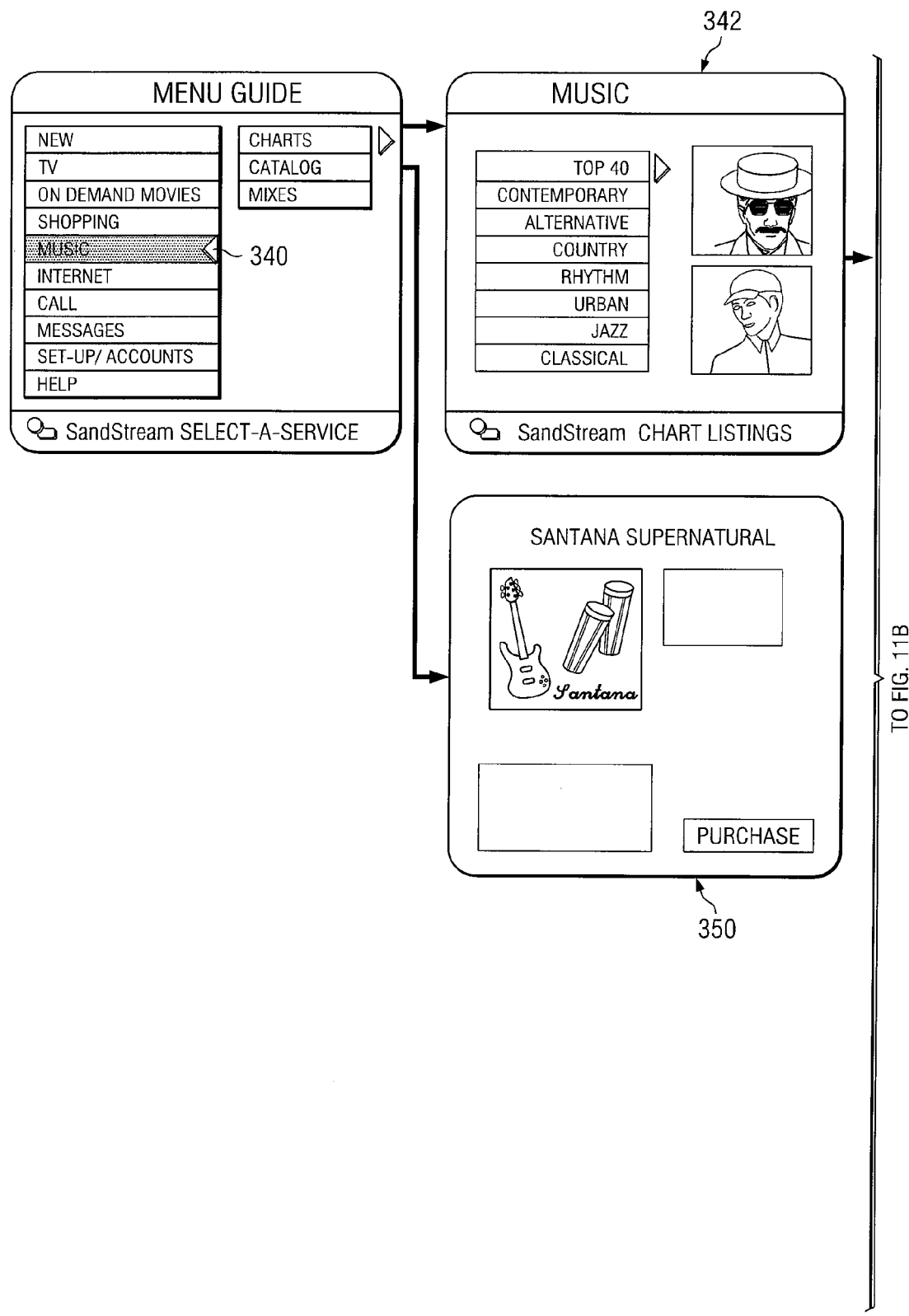
Figure 11B:
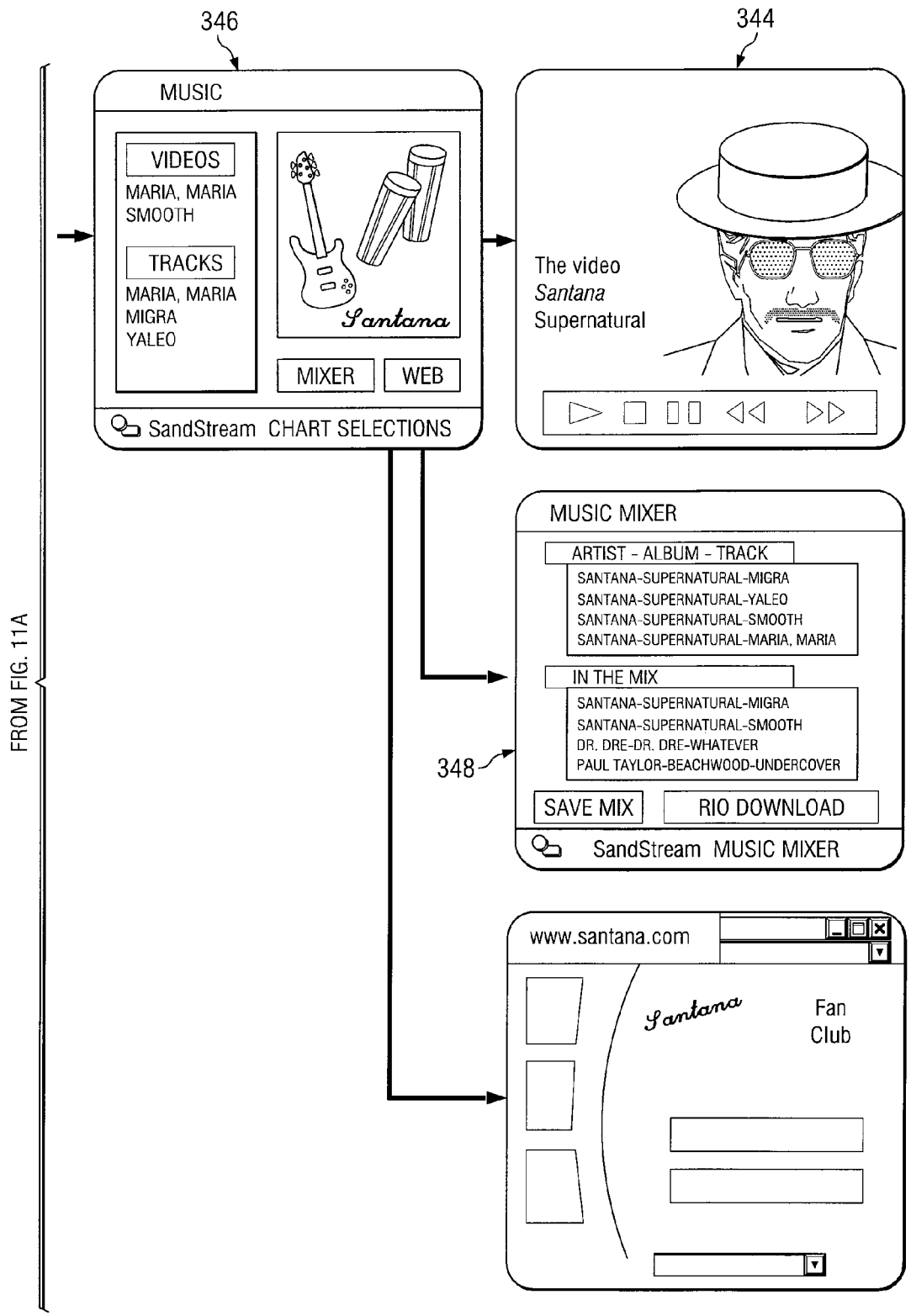

FIG. 11 illustrates exemplary screens associated with a music option 340 of menu 300. After selecting option 340, a user may be provided with a menu screen 342 that provides the user with access to music selections from various artists. The user may select music videos to view for an artist, such as illustrated by screen 344, or may select songs of the artist to listen to using screen 346. Using a screen 348, the user may even create a mix of songs to be played or downloaded as files to the user. For example, MP3 files may be downloaded from MP3 storage array 168. A user may also be provided an opportunity to purchase CDs and other merchandise associated with an artist, such as illustrated by screen 350.

Figure 12A:
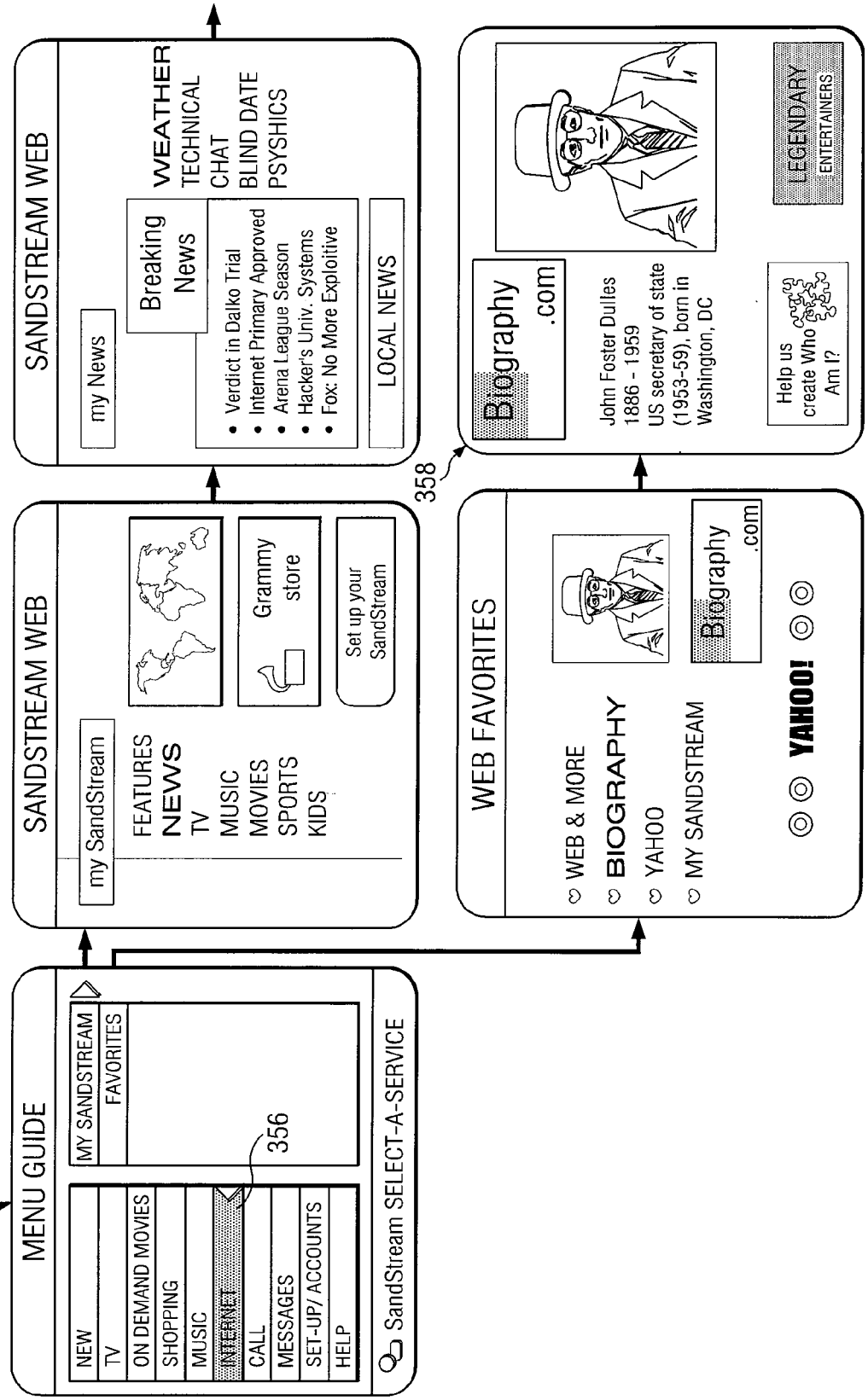
Figure 12B:
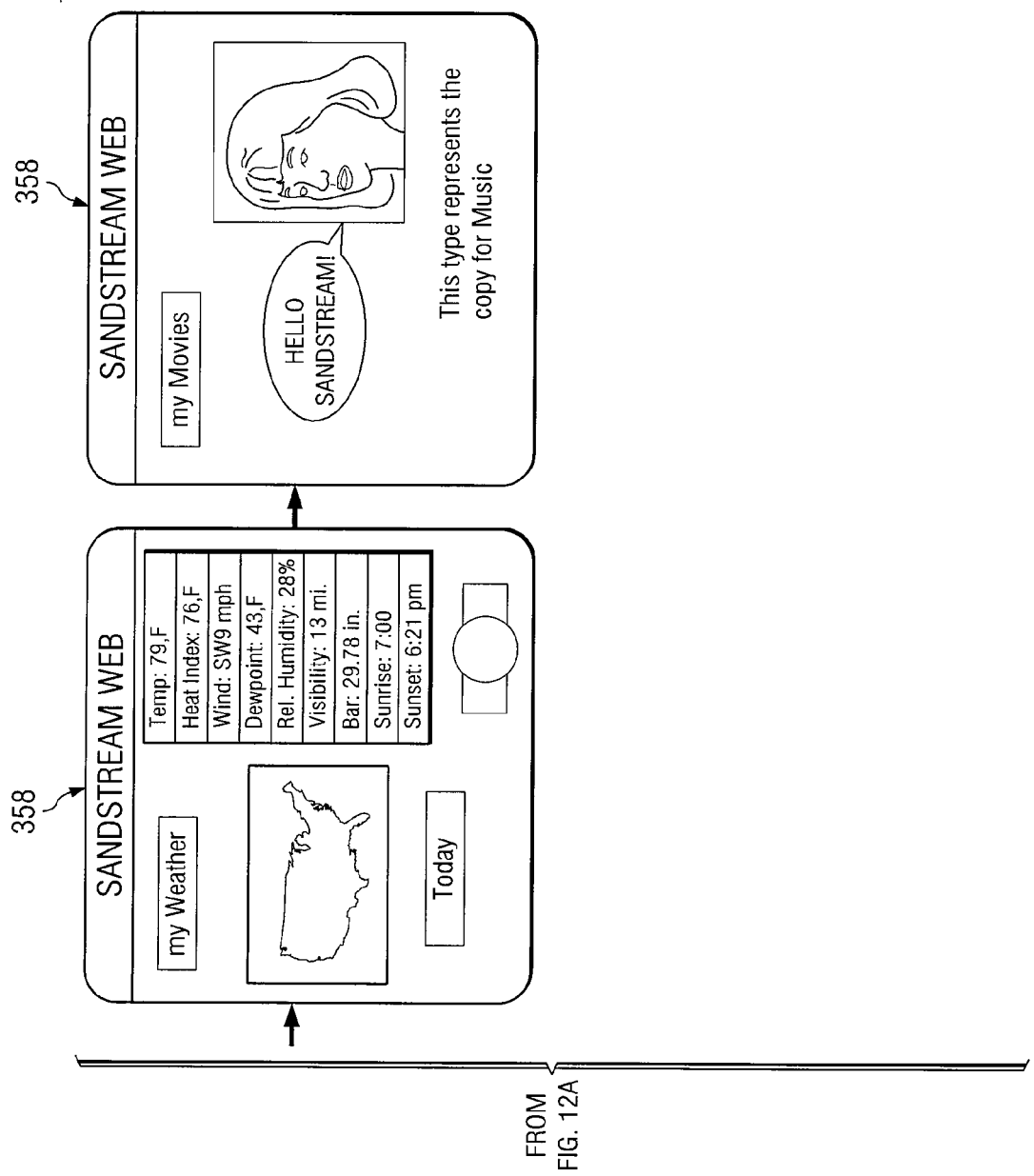

FIG. 12 illustrates exemplary screens associated with an Internet option 356 of menu 300. Internet option 356 may be used to access web pages received from Internet 18, as illustrated by screen 358. Web content may be viewed using a typical Internet browser, or may be viewed through a similar interface provided by set-top box 34. In addition to Internet content, a user may also receive HTML or other similar pages from HTML server 186.

Figure 13A:
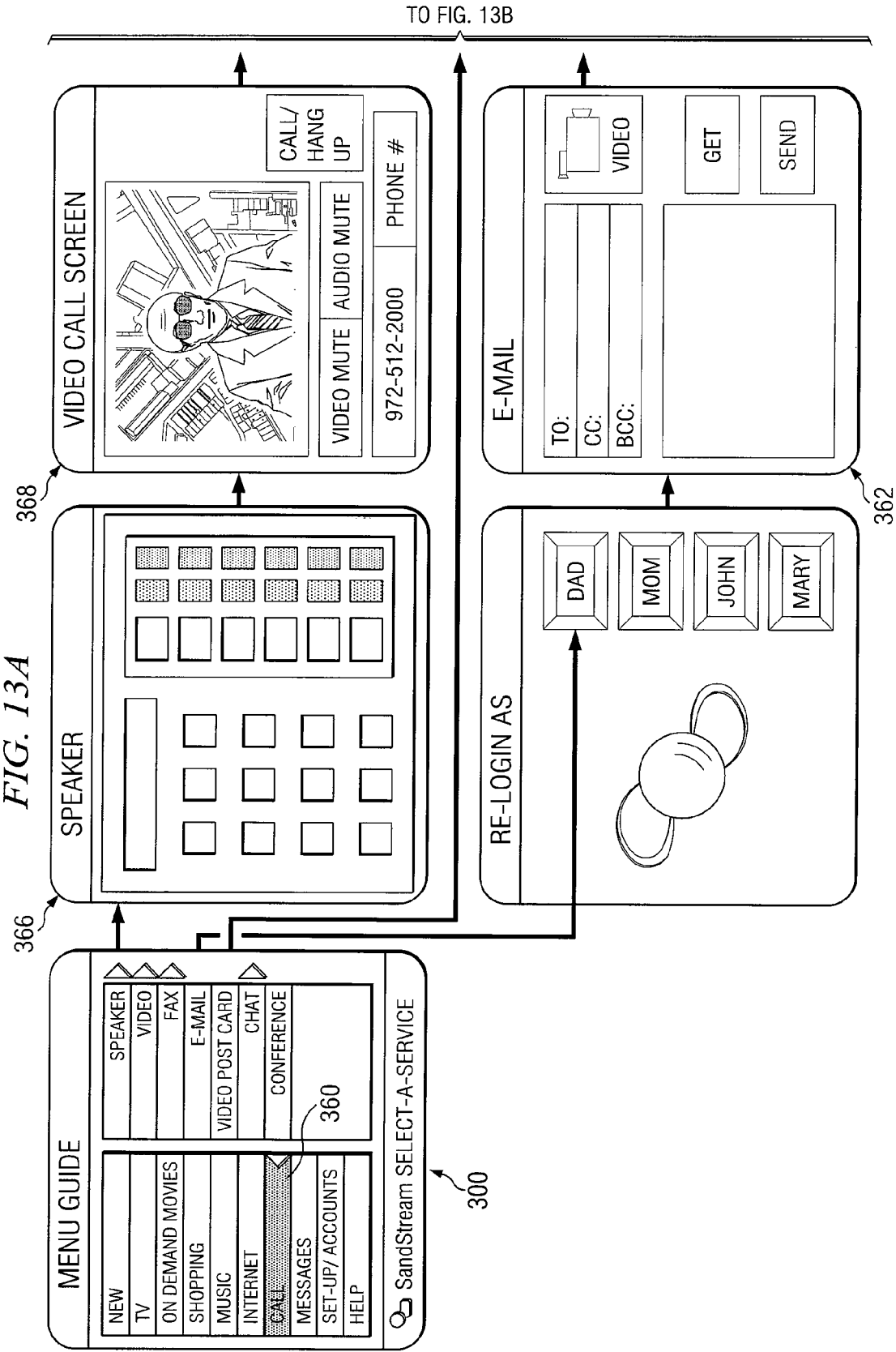

FIG. 13 illustrates exemplary screens associated with a call option 360 of menu 300. Call option 360 provides a user with many different options for initiating communications. These options may include telephone communications, video conferences (which may or not be associated with the telephone communications), e-mail, video postcards, and chat rooms, among others. For example, screen 362 illustrates an e-mail interface for sending e-mail to other customer premises 12 or to users of Internet 18. Screen 364 illustrates a video post card interface for sending video messages to other customer premises 12 or to users of Internet 18. Screen 366 illustrates a speaker phone interface for placing a telephone call (for example, to another customer premises 12 or to a user of PSTN 16) and for selecting an optional video call screen 368, fax screen 370 and/or chat screen 372.

Figure 14A:
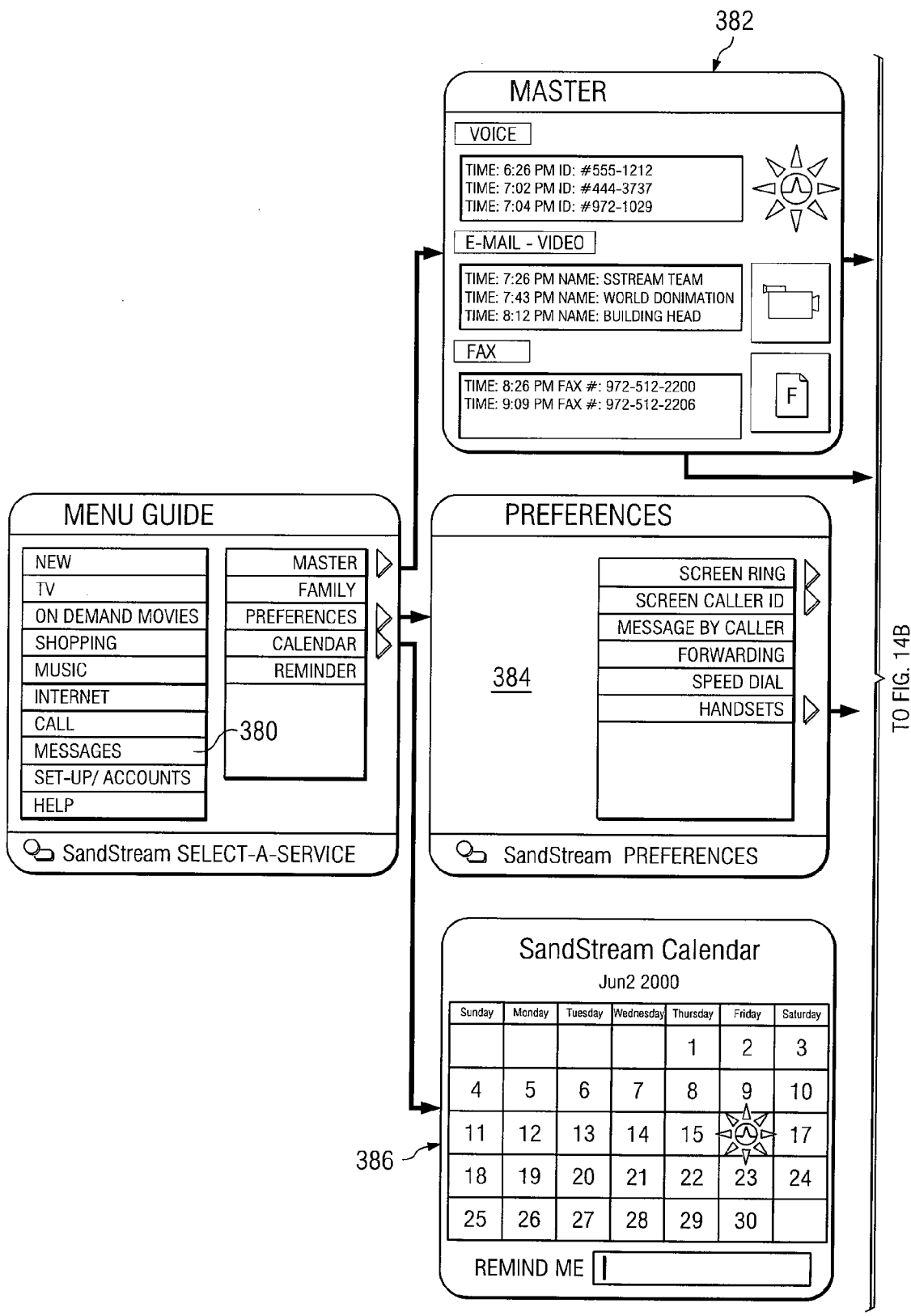
Figure 14B:
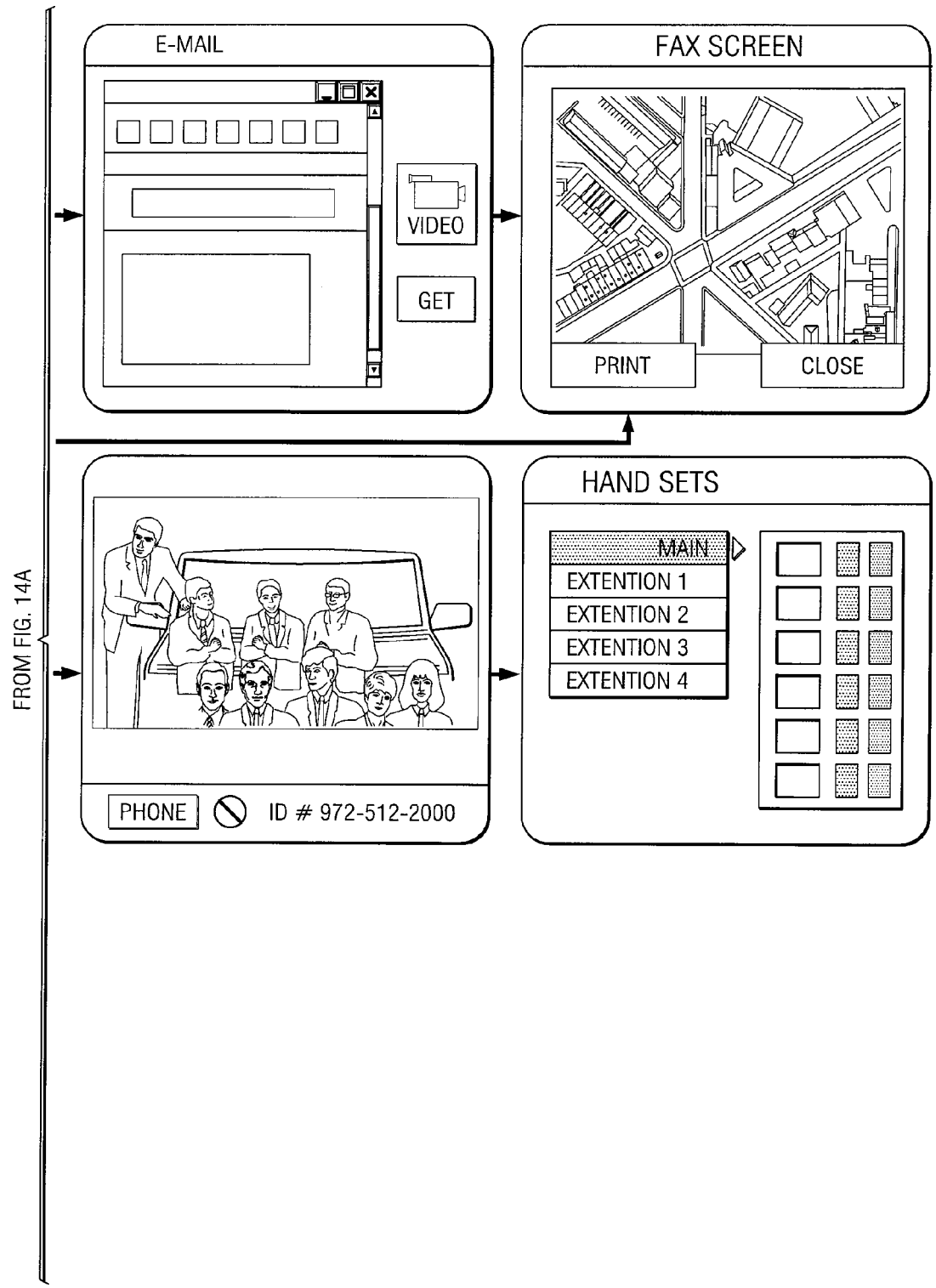

FIG. 14 illustrates exemplary screens associated with a messages option 380 of menu 300. Messages option 380 provides a user with many different options for receiving communications. This may include a master screen 382 that provides the user with a list of various communications that have been received, such as voice mail, e-mail, video-mail (such as video postcards), and fax messages. Messages option 380 may also provide a screen 384 that allows the user to set certain communication preferences. For example, a user may select a caller identification option that allows a user to specify to which devices caller identification information is communicated and the content with which the caller identification information may be combined. For example, the user may indicate that caller identification information should be displayed on a computer 32, a television 36, and an IP telephone 38, and that incoming caller identification information should be displayed in combination with a television show or a movie being viewed on television 36 or in combination with radio programming. The user may also be provided with a calendar screen 386.

Figure 15A:
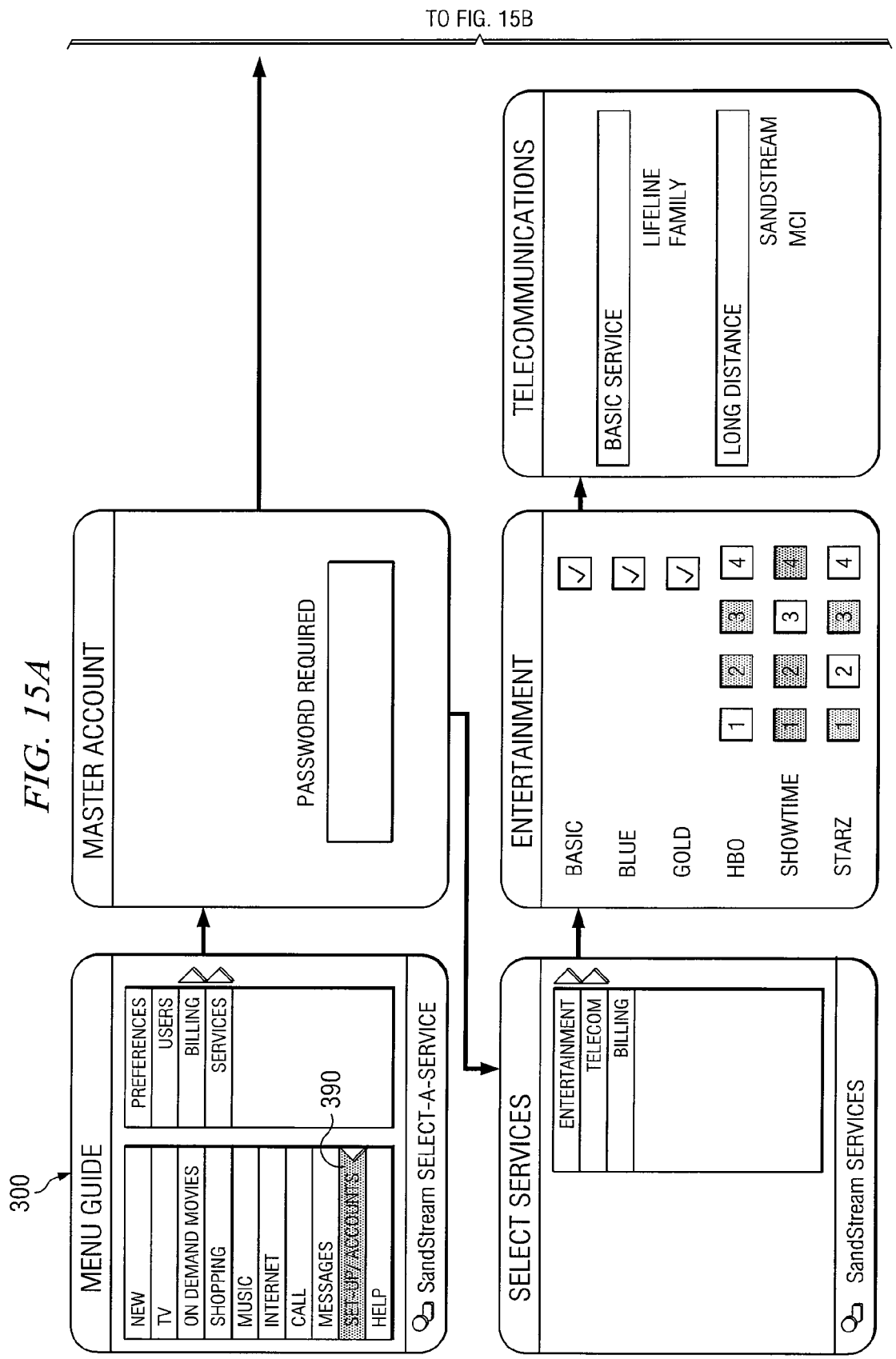
Figure 15B:
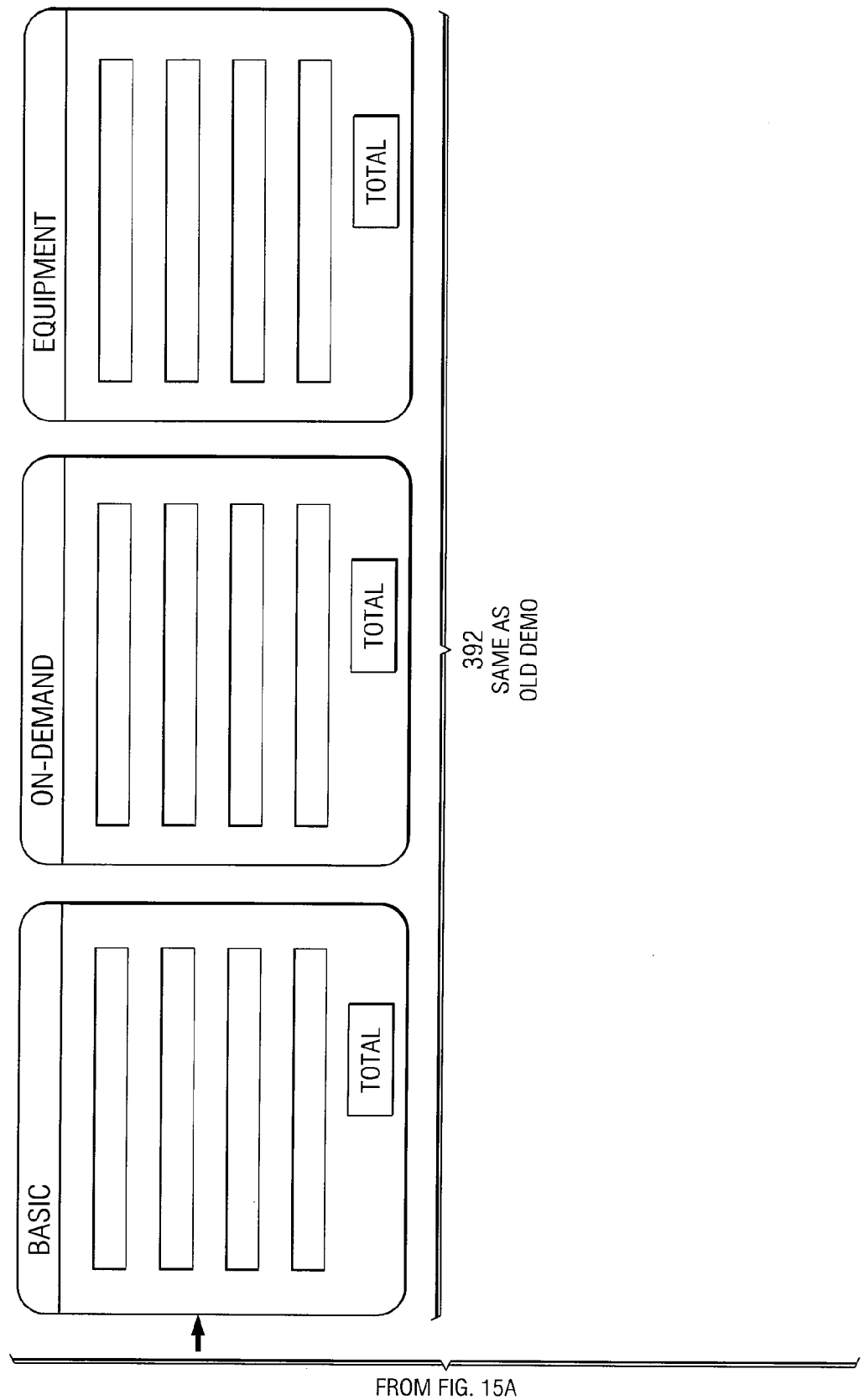

FIG. 15 illustrates exemplary screens associated with an account option 390 of menu 300. Account option 390 allows a user to customize the content that the user receives and view bills associated with this content. For example, screens 392 may deliver an itemization of charges the user has accrued for various goods and services. In addition to billing information for video programming, VOD, and Internet access, the user may also view and settle billing information associated with the purchase of goods and services using shopping option 330 and other appropriate charges. Since numerous types of content and services are provided over network 10, charges for all of the content and services may be combined at one location so that the user does not have to deal with multiple bills from multiple entities.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for providing integrated voice, video, and data content in an integrated service offering to one or more customer premises, comprising:
   receiving television programming from a programming source;
   converting the television programming to a common format for communication over a single network infrastructure using a common communication protocol;
   receiving data from a data network in the common format of the common communication protocol for communication over the single network infrastructure;
   receiving telephone communications from a telephone network;
   converting the telephone communications to the common format for communication over the single network infrastructure using the common communication protocol;
   communicating the converted television programming, data, and converted telephone communications in the common format over the single network infrastructure using the common communication protocol to one or more customer premises to provide the integrated service offering; and
   assigning customer premises to multicast domains to support conditional access of the customer premises to content that is selected from the group consisting of selected television programming, video-on-demand, pay-per-view video, near-video-on-demand, audio channels, audio-on-demand, and interactive gaming, wherein the conditional access is implemented using interdiction.

2. The method of claim 1, further comprising communicating data from a customer premises to the data network in the common format over the single network infrastructure using the common communication protocol.

3. The method of claim 1, further comprising communicating telephone communications from a customer premises to the telephone network in the common format over the single network infrastructure using the common communication protocol.

4. The method of claim 1, wherein the programming source comprises one or more satellite or terrestrial antennas transmitting the content of one or more television channels.

5. The method of claim 1, wherein the programming source comprises one or more digital or tape storage systems transmitting audio or video content.

6. The method of claim 1, where the programming source comprises one or more non-broadcast, switched linear video or audio sources.

7. The method of claim 1, wherein the data network comprises the Internet.

8. The method of claim 1, wherein the data network comprises an intranet or an extranet.

9. The method of claim 1, wherein the telephone network comprises the Public Switched Telephone Network.

10. The method of claim 1, wherein the communications protocol comprises a packet-based communications protocol.

11. The method of claim 1, wherein the communications protocol comprises Internet Protocol (IP).

12. The method of claim 11, wherein communicating the television programming to the customer premises comprises IP multicasting the television programming to multiple customer premises.

13. The method of claim 1, wherein the single network infrastructure comprises an Ethernet network.

14. The method of claim 1, further comprising:
    providing additional content selected from the group consisting of video-on-demand, pay-per-view video, near-video-on-demand, audio channels, audio-on-demand, interactive games, video including media markup and linking, and audio including media markup and linking; and
    communicating the selected content in the common format over the single network infrastructure to one or more customer premises using the common communications protocol.

15. The method of claim 1, further comprising displaying a web page at the customer premises that includes content selected from the group consisting of television programming, video-on-demand, pay-per-view video, near-video-on-demand, audio channels, audio-on-demand, and telephone messaging and configuration information.

16. The method of claim 1, wherein:
    the data comprises media markup and linking information; and
    the method further comprises displaying the media markup and linking information in combination with the television programming at the customer premises.

17. The method of claim 16, wherein the media markup and linking information comprises a link to content selected from the group consisting of television programming, video-on-demand, pay-per-view video, near-video-on-demand, audio channels, audio-on-demand, and interactive gaming.

18. The method of claim 1, wherein:
    the data comprises media markup and linking information; and
    the method further comprises displaying the media markup and linking information in combination with radio programming at the customer premises.

19. The method of claim 1, wherein:
    the data comprises media markup and linking information; and
    the method further comprises displaying the media markup and linking information at the customer premises in combination with content selected from the group consisting of video-on-demand, pay-per-view video, near-video-on-demand, audio channels, audio-on-demand, and interactive gaming.

20. The method of claim 19, wherein the media markup and linking information comprises a link to content selected from the group consisting of television programming, video-on-demand, pay-per-view video, near-video-on-demand, audio channels, audio-on-demand, and interactive gaming.

21. The method of claim 1, wherein:
    the telephone communications comprise caller identification information; and
    the method further comprises displaying the caller identification and caller labeling information in combination with radio programming at the customer premises.

22. The method of claim 1, further comprising encrypting the integrated television programming, data, and telephone communications for decryption by selected customer premises.

23. The method of claim 1, further comprising conditioning access to the integrated television programming, data, and telephone communications based on a list of approved customer premises devices.

24. The method of claim 1, further comprising conditioning access to the integrated television programming, data, and telephone communications based on the geographic location of a customer premises device.

25. A method for providing integrated voice, video, and data content in an integrated service offering to one or more customer premises, comprising:
    receiving television programming from a programming source;
    converting the television programming to a common format for communication over a single network infrastructure using a common communication protocol;
    receiving data from a data network in the common format of the common communication protocol for communication over the single network infrastructure;
    receiving telephone communications from a telephone network, the telephone communications comprising caller identification information;
    converting the telephone communications to the common format for communication over the single network infrastructure using the common communication protocol;
    communicating the converted television programming, data, and converted telephone communications in the common format over the single network infrastructure using the common communication protocol to one or more customer premises to provide the integrated service offering;
    assigning customer premises to multicast domains to support conditional access of the customer premises to content that is selected from the group consisting of selected television programming, video-on-demand, pay-per-view video, near-video-on-demand, audio channels, audio-on-demand, and interactive gaming, wherein the conditional access is implemented using interdiction; and
    displaying the caller identification and caller labeling information in combination with the content at the customer premises.

26. A system for providing integrated voice, video, and data content in an integrated service offering to one or more customer premises, comprising:
    a receiver operable to receive television programming;
    a video encoder operable to convert the television programming into a common format for communication over a single network infrastructure using a common communication protocol;

a telecommunication switch coupled to a telephone network and operable to receive telephone communications from the telephone network;

a gateway operable to convert the telephone communications into the common format for communication over the single network infrastructure using the common communication protocol; and a router coupled to the video encoder, to the gateway, and to a data network that communicates data in the common format using the common communication protocol, the router operable to:

receive the converted television programming, the converted telephone communications, and the data from the data network, all in the common format;

communicate the converted television programming, the converted telephone communications, and the data in the common format over the single network infrastructure using the common communication protocol to one or more customer premises to provide the integrated service offering; and assign customer premises to multicast domains to support conditional access of the customer premises to content that is selected from the group consisting of selected television programming, video-on-demand, pay-per-view video, near-video-on-demand, audio channels, audio-on-demand, and interactive gaming, wherein the conditional access is implemented using interdiction.

27. The system of claim 26, further comprising a customer premises operable to receive and communicate data over the single network infrastructure using the common communication protocol.

28. The system of claim 26, wherein the receiver is operable to receive television programming from a satellite dish.

29. The system of claim 26, wherein the receiver is operable to receive television programming from an antenna.

30. The system of claim 26, wherein the receiver is operable to receive television programming from one or more non-broadcast, switched linear video or audio sources.

31. The system of claim 26, wherein the receiver is operable to receive television programming from one or more digital or tape storage systems transmitting audio or video content.

32. The system of claim 26, wherein the data network comprises the Internet.

33. The system of claim 26, wherein the data network comprises an intranet or an extranet.

34. The system of claim 26, wherein the telephone network comprises the Public Switched Telephone Network.

35. The system of claim 26, wherein the communications protocol comprises a packet-based communications protocol.

36. The system of claim 26, wherein the communications protocol comprises Internet Protocol (IP).

37. The system of claim 36, wherein communicating the television programming to the customer premises comprises multicasting the television programming to multiple customer premises.

38. The system of claim 26, wherein the single network infrastructure comprises an Ethernet network.

39. The system of claim 26, further comprising one or more servers operable to communicate additional content in the common format over the single network infrastructure to one or more customer premises using the common communications protocol, the additional content selected from the group consisting of video-on-demand, pay-per-view video, near-video-on-demand, audio channels, audio-on-demand, interactive games, video including media markup and linking, and audio including media markup and linking.

40. The system of claim 26, further comprising one or more servers operable to communicate a web page to the customer premises that includes content selected from the group consisting of television programming, video-on-demand, pay-per-view video, near-video-on-demand, audio channels, audio-on-demand, and telephone configuration information.

41. The system of claim 26, further comprising one or more servers operable to communicate media markup and linking information in combination with the television programming to the customer premises.

42. The system of claim 41, wherein the media markup and linking information comprises a link to content selected from the group consisting of television programming, video-on-demand, pay-per-view video, near-video-on-demand, audio channels, audio-on-demand, and interactive gaming.

43. The system of claim 26, further comprising one or more servers operable to communicate media markup and linking information to the customer premises in combination with content selected from the group consisting of video-on-demand, pay-per-view video, near-video-on-demand, audio channels, audio-on-demand, and interactive gaming.

44. The system of claim 43, wherein the media markup and linking information comprises a link to content selected from the group consisting of television programming, video-on-demand, pay-per-view video, near-video-on-demand, audio channels, audio-on-demand, and interactive gaming.

45. The system of claim 26, further comprising encryption software operable to encrypt the integrated television programming, data, and telephone communications for decryption by selected customer premises.

46. The system of claim 26, wherein the router is further operable to condition access to the integrated television programming, data, and telephone communications based on a list of approved customer premises devices.

47. The system of claim 26, wherein the router is further operable to condition access to the integrated television programming, data, and telephone communications based on the geographic location of a customer premises device.

48. A system for providing integrated voice, video, and data content in an integrated service offering to one or more customer premises, comprising:

a receiver operable to receive television programming;

a video encoder operable to convert the television programming into a common format for communication over a single network infrastructure using a common communication protocol;

a telecommunication switch coupled to a telephone network and operable to receive telephone communications from the telephone network, the telephone communications comprising caller identification information;

a gateway operable to convert the telephone communications into the common format for communication over the single network infrastructure using the common communication protocol; and a router coupled to the video encoder, to the gateway, and to a data network that communicates data in the common format using the common communication protocol, the router operable to:

receive the converted television programming, the converted telephone communications, and the data from the data network, all in the common format; and communicate the converted television programming, the converted telephone communications, and the data in the common format over the single network infrastructure using the common communication protocol to one or more customer premises to provide the integrated service offering;

assign customer premises to multicast domains to support conditional access of the customer premises to content that is selected from the group consisting of selected television programming, video-on-demand, pay-per-view video, near-video-on-demand, audio channels, audio-on-demand, and interactive gaming, wherein the conditional access is implemented using interdiction; and a network appliance operable to display the caller identification information in combination with the content at the customer premises.

* * * * *